(12) United States Patent
Choi et al.

(10) Patent No.: US 11,686,038 B2
(45) Date of Patent: Jun. 27, 2023

(54) CLOTHING TREATMENT DEVICE

(71) Applicant: LG ELECTRONICS INC., Seoul (KR)

(72) Inventors: Junyoung Choi, Seoul (KR); Wansik Nam, Seoul (KR); Sunghoo Park, Seoul (KR); Hyeyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 17/052,917

(22) PCT Filed: May 15, 2019

(86) PCT No.: PCT/KR2019/005822
§ 371 (c)(1),
(2) Date: Nov. 4, 2020

(87) PCT Pub. No.: WO2019/221505
PCT Pub. Date: Nov. 21, 2019

(65) Prior Publication Data
US 2021/0238793 A1 Aug. 5, 2021

(30) Foreign Application Priority Data

May 16, 2018 (KR) .................. 10-2018-0055927
May 16, 2018 (KR) .................. 10-2018-0055928
(Continued)

(51) Int. Cl.
*D06F 58/10* (2006.01)
*D06F 39/14* (2006.01)
(Continued)

(52) U.S. Cl.
CPC .......... *D06F 58/10* (2013.01); *B29C 44/1214* (2013.01); *B29C 44/1228* (2013.01);
(Continued)

(58) Field of Classification Search
CPC ...... D06F 58/203; D06F 58/206; D06F 39/14; D06F 35/00; D06F 73/02; D06F 58/10;
(Continued)

(56) References Cited

U.S. PATENT DOCUMENTS 3,802,010 A * 4/1974 Smith .................. B63B 32/40
441/74
3,806,566 A * 4/1974 Rubens ................ C08J 9/236
156/320

(Continued)

FOREIGN PATENT DOCUMENTS

CN 102656307 A 9/2012
CN 106471323 A 3/2017
(Continued)

OTHER PUBLICATIONS

Notice of Allowance issued in Russian Application No. 2020141252 dated May 26, 2021 (8 pages).

(Continued)

*Primary Examiner* — Benjamin L Osterhout
(74) *Attorney, Agent, or Firm* — Birch, Stewart, Kolasch & Birch, LLP

(57) ABSTRACT

The present disclosure relates to a clothing treatment device capable of omitting a frame for structurally connecting an inner case and a cabinet by filling a foaming agent between the inner case and the cabinet forming an appearance. The clothing treatment device comprises a cabinet having an opening at the front thereof: a door which is rotatably provided in front of the opening to open and close the opening; an inner case which is provided in the cabinet to
(Continued)

form an accommodation space in which clothes are accommodated, and a hot air supply unit which is provided at the lower portion of the inner case to supply at least one of hot air and moisture to the accommodation space, wherein the inner case is formed of a styrene resin that maintains adhesion to the foaming agent injected into the inner portion of the cabinet.

20 Claims, 21 Drawing Sheets

(30) Foreign Application Priority Data

| | | |
|---|---|---|
| May 16, 2018 | (KR) | 10-2018-0055929 |
| May 16, 2018 | (KR) | 10-2018-0055930 |
| May 16, 2018 | (KR) | 10-2018-0055931 |
| May 15, 2019 | (KR) | 10-2019-0056813 |

(51) Int. Cl.

| | |
|---|---|
| *D06F 58/20* | (2006.01) |
| *D06F 35/00* | (2006.01) |
| *D06F 73/02* | (2006.01) |
| *B29C 44/18* | (2006.01) |
| *B29C 44/12* | (2006.01) |
| *B29C 44/14* | (2006.01) |
| *B29K 625/00* | (2006.01) |
| *B29L 31/00* | (2006.01) |

(52) U.S. Cl.
CPC .............. *B29C 44/14* (2013.01); *B29C 44/18* (2013.01); *D06F 35/00* (2013.01); *D06F 39/14* (2013.01); *D06F 58/203* (2013.01); *D06F 58/206* (2013.01); *D06F 73/02* (2013.01); *B29K 2625/06* (2013.01); *B29L 2031/762* (2013.01)

(58) Field of Classification Search
CPC ..... D06F 58/20; D06F 39/12; B29C 44/1228; B29C 44/1214; B29C 44/18; B29C 44/14; B29K 2625/06; B29L 2031/762
See application file for complete search history.

(56) References Cited

U.S. PATENT DOCUMENTS

| | | | | |
|---|---|---|---|---|
| 3,960,631 | A | * | 6/1976 | Weiss .................... B32B 27/302 |
| | | | | 156/289 |
| 4,751,032 | A | | 6/1988 | Saiamon et al. |
| 5,168,621 | A | | 12/1992 | Kruck et al. |
| 5,173,226 | A | * | 12/1992 | Cazaillon ............... A63C 5/124 |
| | | | | 264/46.7 |
| 5,359,795 | A | * | 11/1994 | Mawby .................... F25C 5/22 |
| | | | | 49/171 |
| 6,797,371 | B1 | * | 9/2004 | Gehlsen ................. B29C 48/08 |
| | | | | 428/313.5 |
| 2003/0080662 | A1 | * | 5/2003 | Taylor ................... F25D 23/062 |
| | | | | 312/406.2 |
| 2010/0218535 | A1 | * | 9/2010 | Candeo ..................... F25C 5/22 |
| | | | | 62/276 |
| 2010/0218566 | A1 | | 9/2010 | Moon et al. |
| 2011/0031254 | A1 | * | 2/2011 | Mortarotti ............ F25D 23/066 |
| | | | | 220/592.2 |
| 2012/0240425 | A1 | | 9/2012 | Park |
| 2014/0346942 | A1 | | 11/2014 | Kim |

FOREIGN PATENT DOCUMENTS

| | | |
|---|---|---|
| CN | 106568262 A | 4/2017 |
| EP | 2514863 A1 | 10/2012 |
| EP | 3296450 A1 | 3/2018 |
| JP | 48-43651 Y | 12/1973 |
| JP | 57-139191 | 2/1981 |
| JP | H10-232084 | 9/1988 |
| JP | H03-31273 | 3/1991 |
| JP | 2018-209467 A | 12/2016 |
| KR | 10-2008-0004028 A | 1/2008 |
| KR | 10-1053630 | 7/2011 |
| KR | 10-2013-0015240 | 2/2013 |
| KR | 10-2013-0017029 | 2/2013 |
| KR | 10-2016-0001539 | 1/2016 |

OTHER PUBLICATIONS

Office Action in Japanese Application No. 2020-562714. dated Nov. 2, 2021 (3 pages).
Search Report in European Application No. 19804016.4 dated Jan. 4, 2022 (8 pages).
PCT International Search Report and Written Opinion for PCT/KR2019/005822, dated Aug. 29, 2019 (6 pages).
Office Action for Indian Application No. 202017050030 dated Mar. 23, 2021 (5 Pages).

* cited by examiner

CLOTHING TREATMENT DEVICE

BACKGROUND

Technical Field

The present disclosure relates to a laundry treating apparatus.

Background

Generally, a laundry treating apparatus refers to an apparatus that carries out a series of processes (e.g., washing, drying, deodorization, wrinkle removal, etc.) in relation to laundry. The term "laundry treating apparatus" may comprise a washing machine for washing laundry, a dryer for drying wet laundry, and a refresher for removing odors or wrinkles out of laundry.

Meanwhile, the development trend of laundry treating apparatuses is toward a single apparatus designed to carry out all of washing, drying, deodorization, and wrinkle removal for laundry. However, the existing laundry treating apparatuses are limited in deodorizing laundry or removing wrinkles from laundry because of the use of a drum for accommodating laundry and a driver for rotating the drum.

To address the problem, referring to "laundry treating apparatus" shown in FIG. 1 and disclosed in the Korean Laid-Open Patent (Application No. 10-2009-0124596), the laundry treating apparatus comprises an inner case 200 having an accommodating space for hanging laundry, a hot-air supply unit (not shown) supplying hot air or moisture from a lower portion of the inner case, and a cabinet 100 provided outside the inner case and the hot-air supply unit to form an external appearance.

The laundry treating apparatus of the related art may supply the hot-air to the hot-air supply unit (not shown) arranged below the cabinet or deodorize laundry and at the same time remove wrinkles of the laundry by pressurizing the laundry in a state that the laundry is hung in the accommodating space provided in the inner case 200. In this way, in a state that the laundry is unfolded inside the cabinet by self-load, the hot-air or moisture may be supplied to the laundry to deodorize the laundry and remove wrinkles of the laundry without a separate unit.

In the laundry treating apparatus of the related art, a frame 10 is additionally provided to fix shapes of the inner case 200, the hot-air supply unit and the cabinet 100 and make sure of durability. The frame 10 includes a plurality of vertical frames 11 provided in a height direction, and a plurality of horizontal frames 12 connecting the vertical frames with one another in a width direction, whereby the inner case 200 may stably be accommodated therein and vibration generated from the hot-air supply unit (not shown) and the like may be supported effectively.

However, the laundry treating apparatus of the related art has inconvenience during a manufacturing process in that the horizontal frames 12 are assembled with the vertical frames 11, the inner case 200 and the hot-air supply unit are fixed to the assembled frame 10 and the cabinet 100 should be coupled to the frame 10 again. Particularly, if the cabinet 100 is provided with a side 120, a rear surface 110 and an upper surface 101, inconvenience occurs in that each element should be coupled to the frame 10.

Also, a drawback occurs in that assembly of coupling members such as 120 bolts or nuts or more is required when the inner case and the cabinet are coupled with each other as well as when the frame 10 is assembled.

Therefore, a long time is required for manufacture of the laundry treating apparatus, and a defect rate is increased like that durability of the laundry treating apparatus cannot be ensured if a specific coupling member is omitted or not completely fastened.

Also, even though the frame is considered to be replaced with a foaming agent, a shape is changed or a sufficient inner space is not ensured when the foaming agent is hardened, or it is difficult to maintain rigidity. For this reason, a problem occurs in that it is difficult to apply the foaming agent to an actual product.

Also, the laundry treating apparatus of the related art has a problem in that the cabinet is provided to be relatively higher than the other home appliances and easily bent by an external force.

SUMMARY

Technical Problem

An object of the present disclosure is to provide a laundry treating apparatus that may omit an assembly process by fixing inner elements through a foaming agent or a foaming insulator (hereinafter, referred to as foaming agent).

Another object of the present disclosure is to provide a laundry treating apparatus that may be prevented from being deformed even though a frame is replaced with a foaming agent, and may maintain rigidity.

Still another object of the present disclosure is to provide a laundry treating apparatus that may make sure of a sufficient inner space even though a frame is replaced with a foaming agent.

Further still another object of the present disclosure is to provide a laundry treating apparatus that may make sure of durability by allowing a foaming agent to be uniformly filled in a gap between inner elements.

Further still another object of the present disclosure is to provide a laundry treating apparatus that may prevent interference with an inner element from occurring even though a frame is replaced with a foaming agent.

Further still another object of the present disclosure is to provide a laundry treating apparatus that may be prevented from being deformed by an external force even though a cabinet is provided to be greater than the other home appliances.

Further still another object of the present disclosure is to provide a laundry treating apparatus that may maintain a shape of a cabinet when a foaming agent is injected into or filled in the cabinet.

Further still another object of the present disclosure is to provide a laundry treating apparatus that may maintain a shape of a cabinet even though a foaming agent is expanded when it is hardened in the cabinet.

Further still another object of the present disclosure is to provide a laundry treating apparatus that may reduce a defect rate by replacing a frame with a foaming agent.

Further still another object of the present disclosure is to provide a laundry treating apparatus that may make sure of durability by allowing a foaming agent to be uniformly filled.

Further still another object of the present disclosure is to provide a laundry treating apparatus that may enhance cohesion between an inner element and a foaming agent.

Further still another object of the present disclosure is to provide a laundry treating apparatus that may maintain rigidity and chemical stability in a high temperature and humidity environment.

Further still another object of the present disclosure is to provide a laundry treating apparatus that may maintain a shape of a cabinet when a foaming agent is injected into or filled in the cabinet.

Further still another object of the present disclosure is to provide a laundry treating apparatus that may maintain a shape of a cabinet even though a foaming agent is expanded when it is hardened in the cabinet.

Technical Solution

To achieve the above objects, a laundry treating apparatus according to the embodiment of the present disclosure comprises a cabinet having an opening in a front direction, a door rotatably provided in front of the opening to open or close the opening, an inner case provided in the cabinet to form an accommodation space in which laundry is accommodated, and a hot-air supply unit provided at a lower portion of the inner case to supply at least one of hot air and moisture to the accommodation space, wherein the inner case is formed of a styrene resin that maintains adhesion to the foaming agent injected into the cabinet.

The foaming agent may be injected between the inner case and the hot-air supply unit as well as between the cabinet and the inner case to maintain strength and shape when the foaming agent is hardened.

The cabinet may include injection holes into which the foaming agent is injected, and a plurality of bent holes discharging the air between the cabinet and the inner case and the air between the inner case and the hot-air supply unit.

The laundry treating apparatus may further comprise a hollow portion provided between an upper surface of the cabinet and an upper surface of the inner case as an empty space where the foaming agent does not enter.

The laundry treating apparatus may further comprise a hanging unit coupled to the upper surface of the inner case to hang or excite the laundry, wherein the hanging unit is provided to be arranged inside the hollow portion.

The laundry treating apparatus of the present disclosure may further comprise a grasp portion provided to be protruded or recessed from the inner case toward the cabinet and coupled with a foaming agent filling a space between the cabinet and the inner case.

The grasp portion may include a grasp case protruded from the inner case toward the cabinet, providing a space therein to accommodate the foaming agent, and a grasp opening provided on one surface of the grasp case to allow the foaming agent to enter the space.

The grasp portion may include a grasp beam protruded from the inner case toward the cabinet and coupled with the foaming agent.

The grasp portion may include a grasp ring protruded from the inner case toward the cabinet and coupled with the foaming agent by allowing the foaming agent to pass through there.

The grasp portion may include a grasp protrusion protruded to one surface of the inner case and accommodated in the foaming agent.

The laundry treating apparatus of the present disclosure may further comprise a hinge unit rotatably coupling the door to the cabinet, and a base provided at a lower portion of the hot-air supply unit to support the inner case and the hot-air supply unit. At least any one of the hinge unit and the base may be fixed to the cabinet together with the inner case and the hot-air supply unit when the inner case and the hot-air supply unit are fixed by the foaming agent.

The base may include a base body provided at a lower portion of the hot-supply unit to form a bottom surface of the cabinet, a body coupling unit provided in the base body to allow the hot-air supply unit to be seated thereon, and a leakage prevention unit extended from the body coupling unit to both sides of the cabinet to prevent the foaming agent from leaking out. The foaming agent may simultaneously fix the hot-air supply unit and the leakage prevention unit if it is injected into the cabinet.

The hinge unit may include a lower hinge coupled to the base body to allow the door to be rotatably coupled thereto.

The lower hinge may include a lower body coupled to the base body, a hinge body coupled to the lower body to allow the door to be rotatably coupled thereto, and a lower hinge shaft extended from the hinge body to an upper portion to form a rotary shaft of the door.

The hinge unit may include an upper hinge provided to allow the door to be rotatably coupled thereto.

The upper hinge may be inserted into a space between the inner case and the cabinet by passing through the space and fixed by the foaming agent.

Advantageous Effects

The present disclosure provides a laundry treating apparatus that may omit an assembly process by fixing an inner element through a foaming agent or a foaming insulator (hereinafter, referred to as foaming agent).

The present disclosure provides a laundry treating apparatus that may be prevented from being deformed even though a frame is replaced with a foaming agent, and may maintain rigidity.

The present disclosure provides a laundry treating apparatus that may make sure of a sufficient inner space even though a frame is replaced with a foaming agent.

The present disclosure provides a laundry treating apparatus that may make sure of durability by allowing a foaming agent to be uniformly filled in a gap between inner elements.

The present disclosure provides a laundry treating apparatus that may prevent interference with an inner element from occurring even though a frame is replaced with a foaming agent.

The present disclosure provides a laundry treating apparatus that may make sure of durability by allowing a foaming agent to be uniformly filled in a gap between inner elements.

The present disclosure provides a laundry treating apparatus that may be prevented from being deformed by an external force even though a cabinet is provided to be greater than the other home appliances.

The present disclosure provides a laundry treating apparatus that may maintain a shape of a cabinet when a foaming agent is injected into or filled in the cabinet.

The present disclosure provides a laundry treating apparatus that may maintain a shape of a cabinet even though a foaming agent is expanded when it is hardened in the cabinet.

The present disclosure provides a laundry treating apparatus that may reduce a defect rate by replacing a frame with a foaming agent.

The present disclosure provides a laundry treating apparatus that may make sure of durability by allowing a foaming agent to be uniformly filled in a gap between inner elements.

The present disclosure manufactures an inner case that may enhance cohesion and adhesion with a foaming agent.

The present disclosure provides a laundry treating apparatus that may maintain durability and chemical stability in a high temperature and humidity environment even though an inner case is coupled with a foaming agent.

The present disclosure provides a laundry treating apparatus that may maintain a shape of a cabinet when a foaming agent is injected into or filled in the cabinet.

The present disclosure provides a laundry treating apparatus that may maintain a shape of a cabinet even though a foaming agent is expanded when it is hardened in the cabinet.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts and their description will be replaced with the first description. The term of a singular expression in this specification should be understood to include a multiple expression as well as the singular expression if there is no specific definition in the context. Also, in description of the embodiment disclosed in this specification, if detailed description of elements or functions known in respect of the present disclosure is determined to make the subject matter of the present disclosure unnecessarily obscure, the detailed description will be omitted. Also, it is to be understood that the accompanying drawings are intended to easily understand the embodiment disclosed in this specification and technical spirits disclosed in this specification should not be restricted by the accompanying drawings.

Figure 1:
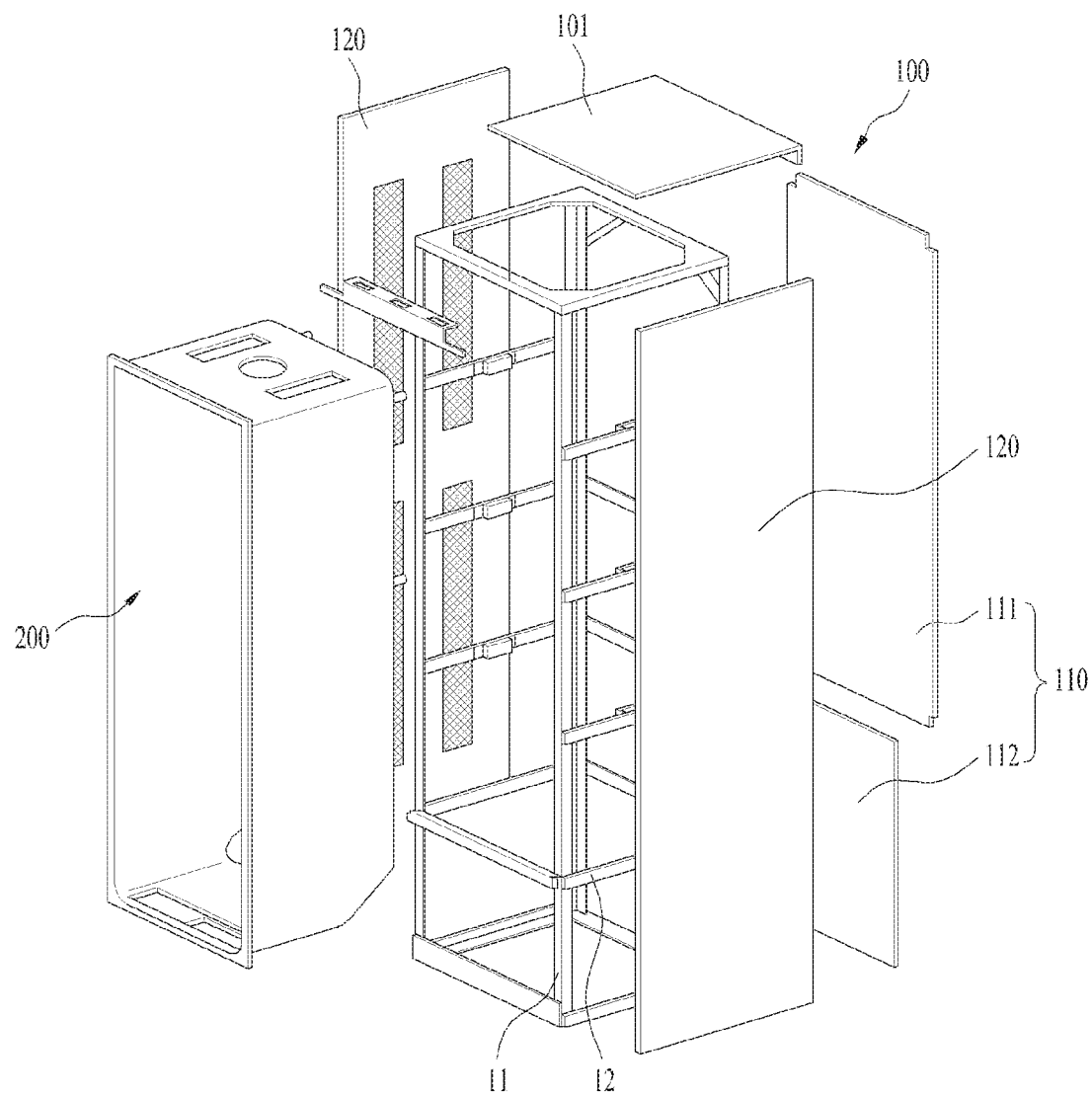
FIG. 1 illustrates an assembly structure of a laundry treating apparatus of the related art.
Figure 2A:
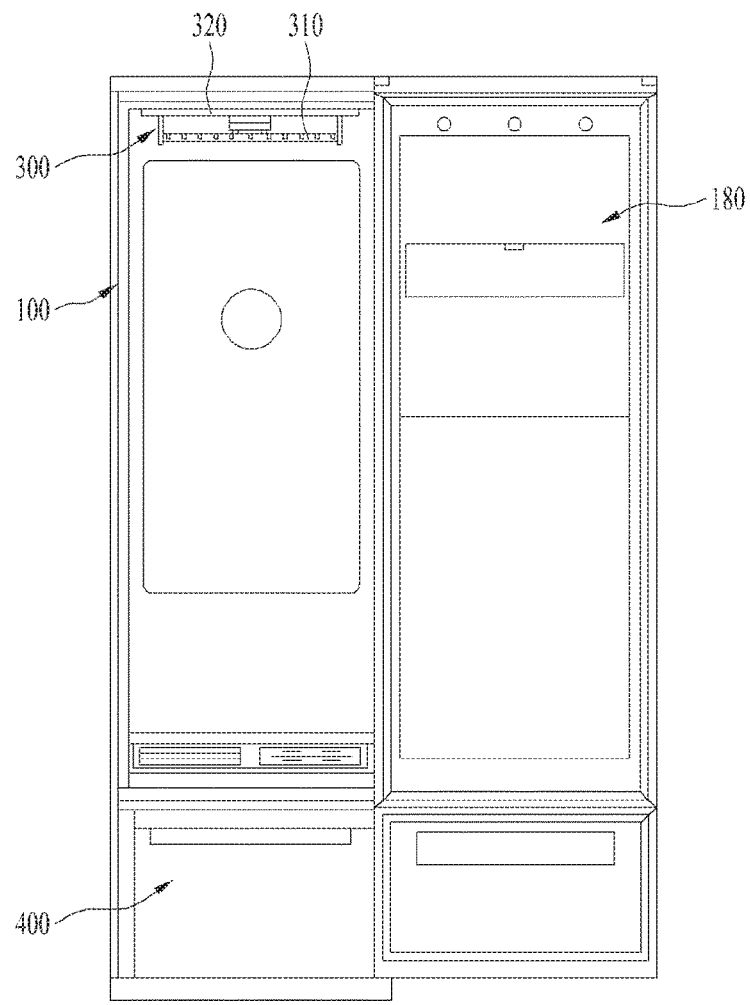
FIGS. 2A and 2B illustrate a structure of a laundry treating apparatus according to the present disclosure.
Figure 2B:
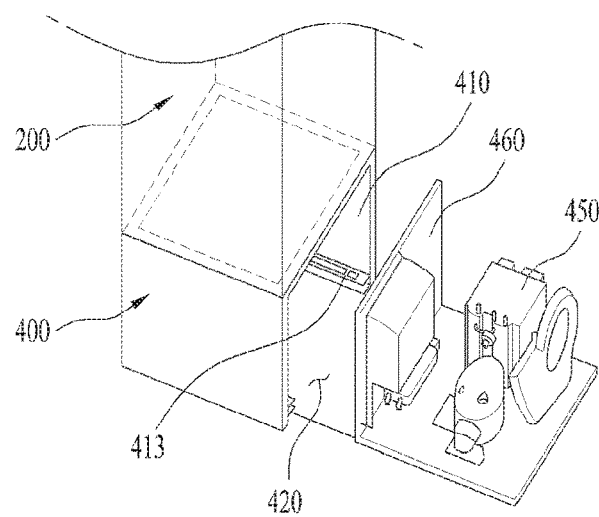

FIGS. 2A and 2B illustrate a structure of a laundry treating apparatus according to the present disclosure.

Referring to FIG. 2A, the laundry treating apparatus according to the present disclosure a cabinet 100 having an opening 130 in a front direction, a door 180 rotatably provided at the front of the opening to open or close the opening, an inner case 200 provided in the cabinet, forming an accommodating space in which laundry is accommodated, and a hot-air supply unit 400 provided at one side of the inner case, supplying one or more of the hot-air and moisture to the accommodating space.

The door 180 may be provided to seal the opening 130 and guide the hot-air or moisture supplied to the accommodating space to be fully exposed to laundry without leaking out.

A hanging unit 300 for hanging laundry or uniformly exposing the laundry to the hot-air or moisture by exciting the laundry may be provided at an upper portion of the inner case 200.

The hanging unit 300 may include a hanging bar 310 coupled to an upper surface of the inner case 200 to hang laundry, and an excitation unit 320 vibrating the hanging bar 310.

The excitation unit 320 may include a motor vibrating the hanging bar 310, and a transfer unit coupled to the hanging bar 310 to transfer a power of the motor to the hanging bar 310, and may be provided in any shape that may vibrate the hanging bar 310.

Since the hot-air supply unit 400 generates the hot-air having density which is relatively low, the hot-air supply unit 400 is preferably provided at a lower portion of the inner case 200 to allow the hot-air to be easily supplied to the laundry.

Also, one or more communication holes 212 communicated with the hot-air supply unit 400 may be provided on a lower surface of the inner case 200 In detail, the communication holes 212 may be provided in a plural number, wherein any one communication hole 212a may be provided to discharge the hot-air, and the other one communication hole 212b may be provided to allow the hot-air to be discharged to the hot-air supply unit 400 after performing refresh such as drying, wrinkle removal and deodorization of the laundry.

Referring to FIG. 2B, the hot-air supply unit 400 may include a heat pump 450 supplying one or more of the hot-air and moisture to the accommodating space, and an accommodating body 410 provided at a lower portion of the accommodating space to accommodate the heat pump 450. The accommodating body may include a communication inlet 401 (see FIG. 3) communicated with the communication hole 212 to supply the air to the heat pump 450 or discharge the hot-air supplied from the heat pump 450 to the accommodating space.

The accommodating body 410 may include a through portion 420 provided to allow the heat pump 450 to be exposed to any one of a front direction or a rear direction. In this case, a user may easily approach the heat pump 450 and the like by only opening the door 180.

Also, for convenience of arrangement and maintenance of the heat pump 450, the hot-air supply unit 400 may further include a withdrawal unit 460 withdrawing the heat pump 450 to the outside of the through portion 420 while supporting the heat pump 450, and a guide 413 provided on an inner side of the accommodating body 410 to guide withdrawal or insertion of the withdrawal unit 460.

Therefore, the user may withdraw the heat pump 450 from the cabinet 100 to easily maintain and repair the heat pump 450, and the heat pump 450 may be manufactured separately and then the hot-air supply unit 400 may be provided in a module manner.

The withdrawal unit 460 may be provided in a plate shape, or may be provided in a shape of 'L' to shield a withdrawal hole 190 provided on a rear surface of the cabinet.

The guide 413 may be provided as a roller or rail that may support and guide the withdrawal unit 460.

The heat pump 450 may include an evaporator cooling the air from the accommodating space to condense moisture contained in the air, a compressor compressing and heating a refrigerant that has passed through the evaporator, a condenser generating the hot-air by heating the cooled air by using the refrigerant discharged to the compressor, and a valve reducing a temperature by expanding the refrigerant that has passed through the condenser.

Also, the heat pump 450 may further include a steam generator generating steam or mist in a portion where the air moves, and may further include a ventilating fan providing a power for circulating the hot-air.

Although not shown, the heat pump 450 may include a moving duct that may allow the air accommodated in the inner case 200 to be supplied to the inner case 200 by passing through the evaporator and the condenser without leaking out, wherein the moving duct may be provided to be communicated with the communication inlet 401, and the ventilating fan may be provided in the moving duct.

Figure 3:
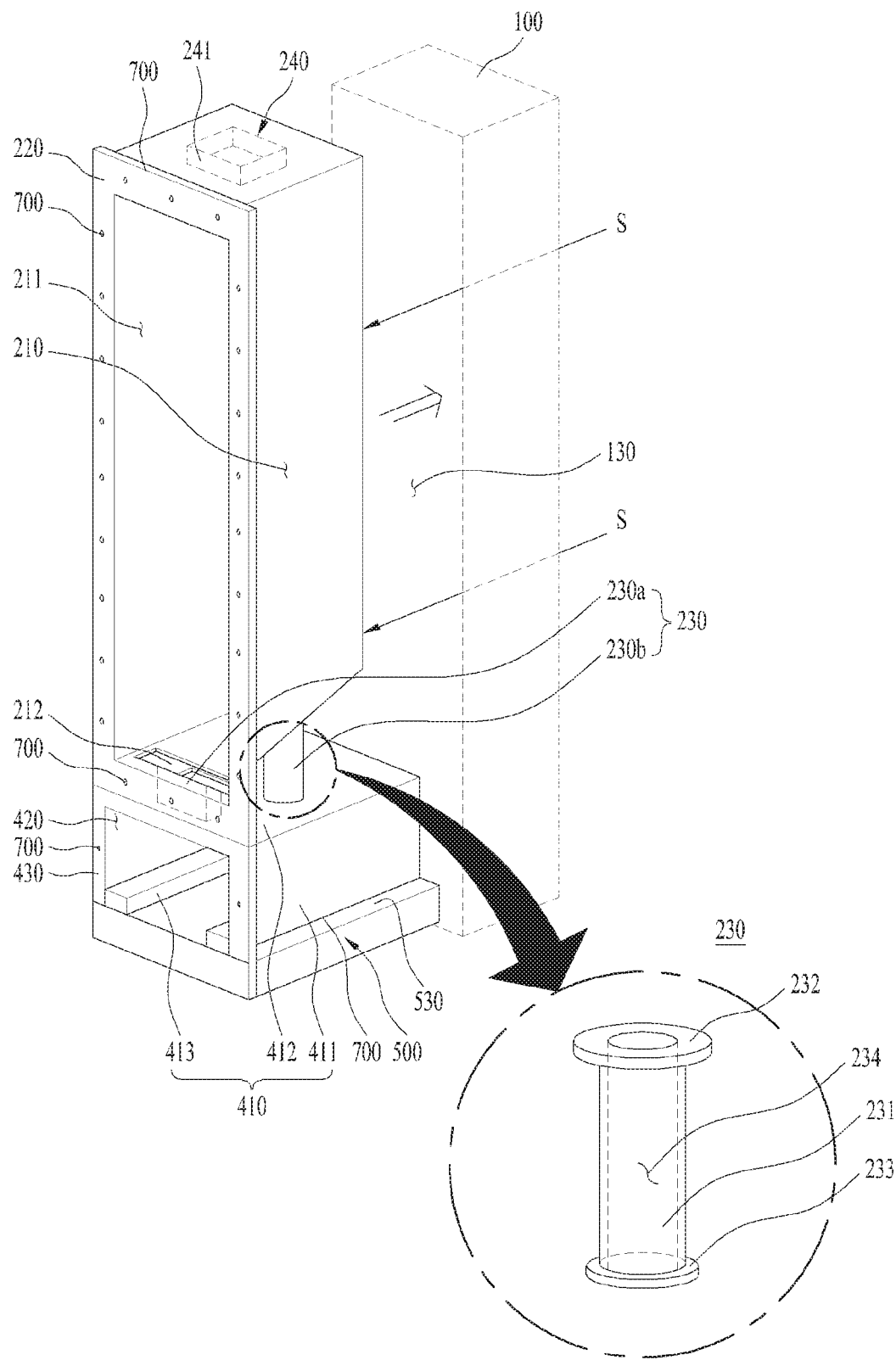
FIG. 3 illustrates a structure that a laundry treating apparatus of the present disclosure is fixed by a foaming agent.

FIG. 3 illustrates a structure that a laundry treating apparatus of the present disclosure may be manufactured through a foaming agent by omitting a frame.

Referring to FIG. 3, the cabinet 100 may be provided in a shape of box, and the inner case 200 and the hot-air supply unit 400 may be connected with each other and fixed by being inserted into the opening 130.

Afterwards, the foaming agent may be inserted through the rear surface of the cabinet 100 and thus may be filled in the cabinet 100 and an outer space of the inner case 120 and the hot-air supply unit 400.

The foaming agent may be made of a liquefied foamed insulation material. The foaming agent may be inserted into the cabinet 100 and filled in the space formed by the inner case 200, the hot-air supply unit 400 and the cabinet 100, and then may be cooled and hardened with the passage of time.

Therefore, the foaming agent may fix positions of the inner case 200 and the hot-air supply unit 400 while being in contact with outer surfaces of the inner case 200 and the hot-air supply unit 400 and an inner surface of the cabinet 100. Also, the foaming agent may maintain the shape of the cabinet 100 while being filled in the space inside the cabinet 100, and may absorb an external impact or vibration at a certain amount to make sure of durability even though the external impact or vibration occurs.

As a result, since the laundry treating apparatus 10 of the present disclosure may fix the inner case 200 and the hot-air supply unit 400 even though the frame 10 is omitted, an assembly process of coupling members such as bolts and nuts may be omitted, whereby a whole weight of the laundry treating apparatus may be reduced.

Moreover, as the inner case 200 and the hot-air supply unit 400 are insulated, leakage of energy may be avoided to maximize efficiency. Even though the user is located near the laundry treating apparatus 10 while the laundry treating apparatus 10 is operating, the user may not feel displeasure due to heat and a negligent accident such as burn may be prevented.

Meanwhile, even though the foaming agent may be inserted into the cabinet 100 and then filled in the inner space of the cabinet 100, the foaming agent needs to be prevented from leaking out until the foaming agent is hardened.

To this end, the inner case 200 may include an inner body 210 provided at the front of the accommodating space, having an inlet 211 through which laundry is inserted, and a shielding rib 220 extended from an outer circumferential surface of the inlet to the opening 130 to prevent the foaming agent from leaking out.

Unlike the shown drawing, a coupling rib 131 extended from the opening 130 toward the inlet 211 of the inner body may be provided in the cabinet 100.

That is, if the inner body 210 and the cabinet 100 may be prevented from being exposed in a front direction, the inner body 210 and the cabinet 100 may be provided in any shape and structure.

Also, the hot-air supply unit 400 may further include a prevention rib 430 extended from an outer circumferential surface of the through portion 420 to the opening 130 to prevent the foaming agent from leaking out.

The shielding rib 220 and the prevention rib 430 may prevent the foaming agent entering the cabinet 100 from leaking out through the opening 130 by shielding the opening 130.

Meanwhile, the shielding rib 220 provided at a lower end of the inlet 221 and the prevention rib 430 provided at an upper end of the through portion 420 may be provided to be tightly attached to each other to shield the foaming agent between the inner case 200 and the hot-air supply unit 400 from leaking out.

Also, the accommodating body 410 of the hot-air supply unit 400 may be provided to be more extended than the inner case 200 in a rear direction so that the foaming agent 's' may be shielded from entering the rear of the through portion 420.

That is, although the rear surface of the inner case 200 is spaced apart from the rear surface of the cabinet 100, the accommodating body 410 may be provided to be extended until it may be in contact with or coupled to the rear surface of the cabinet 100.

Therefore, a front and rear length of the accommodating body 410 may be longer than that of the inner case 200.

As a result, the withdrawal unit 460 may be withdrawn from the cabinet 100 without colliding with the foaming agent.

Meanwhile, the laundry treating apparatus 10 of the present disclosure may comprise a base 500 provided at a lower portion of the hot-air supply unit to form a bottom surface of the cabinet 100 or accommodated in the cabinet 100 to support the inner case 200 and the hot-air supply unit 400.

The base 500 may be made of a material that absorbs vibration to prevent vibration from being transferred to the outside of the laundry treating apparatus 10.

The foaming agent S may be filled between bottom surfaces of the cabinet 100 to fix the base 500. Alternatively, the base 500 may be provided to be withdrawn to the outside of the cabinet 100. In this case, the base 500 may serve as the withdrawal unit 460.

Meanwhile, the inner case 200 may be made of a polypropylene (PP) resin which is generally used. This is because that the PP resin has excellent mobility and dimension stability to facilitate molding and has excellent strength.

However, since the inner case 200 is a high temperature and humidity environment due to the hot-air or moisture supplied from the hot-air supply unit 400, it may be difficult to make sure of strength of the PP resin. Moreover, since the PP resin has a problem in that it has no excellent adhesion with the foaming agent, it may be difficult to form the inner case 200 of the PP resin. This is because that the inner case 200 may move inside the cabinet 100 or may be detached from the cabinet 100 if the foaming agent is not sure of adhesion.

Therefore, the laundry treating apparatus 10 of the present disclosure needs to apply a material, which may maintain cohesion and adhesion with the foaming agent even in a high temperature and humidity environment, to the inner case 200.

To this end, in the laundry treating apparatus 10 of the present disclosure, the inner case 200 may be made of a styrene resin that may maintain adhesion with the foaming agent S.

The styrene resin is an aromatic hydrocarbon having a structure that one hydrogen from a benzene ring is substituted by a vinyl group, and is a kind of oil chemistry based thermoplastic resin, and means a resin made of polystyrene which is a polymer of a liquid styrene unit body generated by reacting ethylene with benzene. The styrene resin is known that adhesion with the foaming agent is excellent, and may maintain its original property even in a high temperature and humidity environment as its boiling point is 145° C. or more.

Therefore, the inner case 200 is made of the styrene resin and thus may maintain durability at a certain level even in a high temperature and humidity environment and also maintain adhesion with the foaming agent, and may stably be fixed to the cabinet 100.

In detail, the inner case 200 may be made of an acrylonitrile butadiene styrene copolymer (ABS) resin that may maintain adhesion with the foaming agent and has excellent impact resistance to make sure of strength.

The ABS resin is a styrene resin made of three components of styrene, acrylonitrile and butadiene, and has impact resistance greater than that of a general styrene resin which is easy to be processed and has heat resistance more excellent that that of the general styrene resin.

In detail, the ABS resin has heat resistance more excellent than the PP resin as much as 16%, and has impact resistance more excellent than the PP resin as much as 5.6 times or more. Therefore, the ABS resin may maintain its original property even in a high temperature and humidity environment such as the inner case 200, and has an excellent adhesion even with the foaming agent to maintain strength and rigidity in the middle of being tightly adhered with the foaming agent and even in a state that it is tightly adhered with the foaming agent.

Therefore, the inner case 200 may be made of an ABS material and adhered with the foaming agent regardless of a liquid state and a solid state of the foaming agent, whereby the inner case 200 may fully be fixed to the cabinet 100.

Moreover, since the ABS resin is excellent in rigidity, heat deflection temperature, and the like, the ABS resin may be prevented from being physically deformed and degenerated even though it is continuously exposed to the high temperature and humidity environment.

Meanwhile, the inner case 200 is likely to be exposed to various secretions such as sweat and spit discharged from laundry and external particles.

Therefore, if the secretions and the particles are adsorbed into the inner case 200, a problem may occur in that cleanliness of the laundry treating apparatus 10 cannot be ensured.

Moreover, if the inner case 200 chemically reacts with the secretions and particles detached from the laundry, a problem may occur in that a color of the inner case 200 is or sanitation and stability of the inner case cannot be ensured.

Therefore, the inner case 200 may be required to be made of a resin having color maintenance and strength, which are more excellent than those of APS resin, and having excellent heat resistance, chemical resistance and thermal stability.

To this end, the laundry treating apparatus 10 of the present disclosure may be manufactured such that the inner case 200 is made of ASA resin of a styrene resin.

The ASA resin is an Acrylate-Styrene-Acrylonitrile (ASA) resin, and is known that weather resistance, chemical resistance, and heat resistance are very excellent as it does not include an unstable double bond in a polymer like ABS.

That is, even though the ASA resin is exposed to each or all of an organic material containing secretions, an inorganic material containing particles, the hot-air and moisture, its physical and chemical properties may not be varied.

Therefore, if the inner case 200 is made of the ASA resin, even though the inner case 200 is exposed to the hot-air or moisture, the inner case 200 may be prevented from being chemically reacted with a fluid inside the accommodating space. As a result, it is possible to make sure of strength of the inner case 200 and fundamentally prevent smell from being adsorbed into the inner case 200.

Meanwhile, since the hanging unit 300 is provided at the upper portion of the inner case 200, it is required to prevent the foaming agent from entering there.

To this end, the laundry treating apparatus 10 of the present disclosure may further include a hollow portion 240 forming an empty space by preventing the foaming agent from entering there such that the hanging unit 300 may be provided between an upper surface 101 of the cabinet and the inner case 200.

The hollow portion 240 may be formed by forming a molding article fitted into the upper surface of the cabinet 100 and the upper surface of the inner case 200 in a jig for fixing the cabinet 100 and the inner case 200 during a foaming process.

Also, the hollow portion 240 may be generated by injecting the foaming agent into a separate case inserted between the cabinet 100 and the inner case 200 and then removing the case after a certain time.

Moreover, the hollow portion 240 may be formed by being separately provided with a rib or case extended from the inner surface of the cabinet 100 to the inner case 200 or extended from the inner case 200 to the inner surface of the cabinet 100.

The hollow portion 240 may prevent the hanging unit 300 from interfering with the foaming agent even though the foaming agent is inserted into the cabinet 100, and may make sure of convenience in arrangement or repair of the hanging unit 300.

The hollow portion 240 may be provided in a shape of a hexahedron as shown, but may be provided to correspond to an outer shape of the hanging unit 300 or in another shape in which the hanging unit 300 may be accommodated.

The hollow portion 240 may be provided in any shape and volume if the hanging unit may be provided without filling the foaming agent therein.

For example, in the laundry treating apparatus 10 of the present disclosure, the hollow portion 240 may be generated to include a shielding case 241 coupled to the upper surface of the inner case 200 to shield the foaming agent from entering the inner case.

The shielding case 241 may be provided at an interval from the upper surface of the inner case 200 to the upper surface 101 of the cabinet and thus fitted into the inner case 200 and the upper surface 101 of the cabinet.

Moreover, the shielding case 241 may be provided in a single body with the inner case 200.

The shielding case 241 may be provided in a shape of a hexahedron as shown, but may be provided to correspond to the outer shape of the hanging unit 300 or in another shape that may make sure of the hollow portion 240.

The shielding case 241 may be provided in any shape and volume if the hanging unit may be provided without filling the foaming agent therein.

Meanwhile, while a foaming agent is being filled between the inner case 200, the hot-air supply unit 400 and the cabinet 100, the air corresponding to a volume of the filled foaming agent should be discharged to the outside of the cabinet 100. This is because that a space where the foaming agent is not filled occurs inside the cabinet 100 if the air is not quickly discharged to the outside of the cabinet 100 during the foaming process.

To this end, a plurality of bent holes 700 through which the air inside the cabinet 100 may be discharged may be provided in the cabinet 100, the inner case 200 and the hot-air supply unit 400.

The bent holes 700 may be provided with a diameter through which the air is only discharged, without discharging the liquid foaming agent to the outside even though the foaming agent is in contact with the bent holes. That is, since the liquid foaming agent has viscosity which is relatively strong, if the bent hole 700 has a small diameter, the foaming agent may not be discharged to the outside of the bent hole 700 even though the foaming agent enters the bent holes 700 or is in contact with the bent hole 700. For example, the diameter of the bent hole 700 may be 0.5 mm to 1.5 mm. Therefore, the air may only be discharged to the bent hole 700, and the foaming agent may be prevented from being discharged.

Meanwhile, if the air is discharged to the bent hole 700, a relative sound pressure is generated, whereby the foaming agent may be guided to approach the bent hole 700. Therefore, the bent hole 700 may serve to guide the foaming agent to approach there to fill the foaming agent therein.

Meanwhile, if the foaming agent is filled through the cabinet 100 such as the rear surface of the cabinet 100, the bent hole 700 may be provided in at least any one of the shielding rib 220 and the prevention rib 430 to uniformly fill the foaming agent in the front of the inner case and the front of the hot-air supply unit 400. The bent hole 700 may be provided in a plural number along a length direction of the shielding rib 220 and the prevention rib 430. Therefore, if the foaming agent is filled into the cabinet 100, the air inside the cabinet 100 is discharged to the bent hole 700 provided in the prevention rib 430 and the shielding rib 220 and the foaming agent may be supplied by reaching rear surfaces of the prevention rib 430 and the shielding rib 220.

In other words, since the shielding rib 220 is provided on the outer circumferential surface of the inlet 211 and the prevention rib 430 is provided on the outer circumferential surface of the through portion 420, the foaming agent may be filled along the outer circumferential surface of the inner body 210 and the outer circumferential surface of the accommodating body 410 due to the bent hole 700 and may reach the prevention rib 430 and the shielding rib 220. As a result, the inside of the cabinet 100 and the outside of the inner body 210 and the accommodating body 410 may fully be filled with the foaming agent.

Meanwhile, the communication inlet 401 provided on an upper surface 412 of the accommodating body 410 and the communication hole 212 on the lower surface of the inner body 210 need to be communicated with a communication duct 230. The communication duct 230 may be provided to be coupled to the inner body 230 and the accommodating body 410 before the foaming agent is injected. Also, the communication duct 230 may serve to prevent the foaming agent from entering the communication inlet 401 and the communication hole 212.

In detail, the communication duct 230 may include a duct body 231 communicating the inner case 200 with the hot-air supply unit 400, a duct seating portion 232 provided to be extended from one end of the duct body 231 and seated on the lower surface of the inner case 200, and a duct insertion portion 233 extended from the other body of the duct body and inserted into the hot-air supply unit 400.

The duct body 231 may be provided in a shape corresponding to any one of the heat pump 450, the communication hole 212 and the communication inlet 401, and may make sure of a space where the air moves by forming a hollow therein. The duct insertion portion 233 may be provided in the same diameter as that of the duct body 231 or a diameter a little greater than that of the duct body 231 and thus forcibly fitted into or inserted into at least one of the communication hole 212 and the communication inlet 401. The duct seating portion 232 may be provided to be greater than the diameter of the duct body 231 and then seated on the lower end of the inner body 210 or the upper end of the communication hole 212 to determine the position of the duct body 231.

Therefore, the duct insertion portion 233 may simultaneously pass through and inserted into the communication hole 212 and the communication inlet 401 until the duct seating portion 232 is seated on the communication hole 212, whereby the duct insertion portion 233 may be communicated with the heat pump 450. That is, the communication duct 230 may fix the inner case 200 and the hot-air supply unit 400 by communicating the inner case 200 and the hot-air supply unit 400 with each other before the foaming agent is injected into the inner case 200 and the hot-air supply unit 400. The communication duct 230 may be provided in a plural number to correspond to the number of the communication holes 212 and the communication inlets 401.

Also, the duct insertion portion 233 and the duct seating portion 232 may be made of a material having a soft material or elasticity, whereby the duct insertion portion 230 may easily be provided in the communication inlet 401 and the communication hole 212.

Figure 4A:
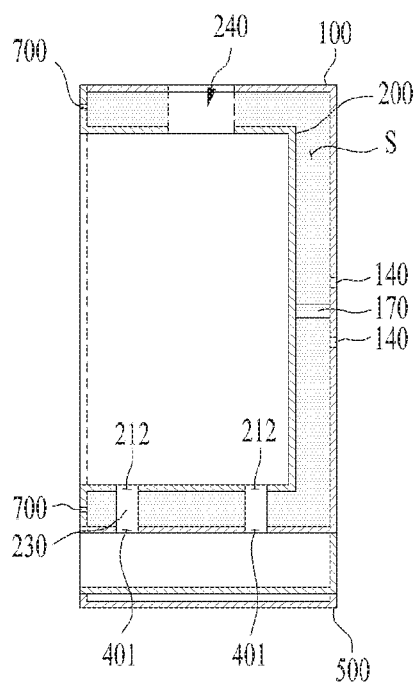
FIGS. 4A, 4B, and 4C illustrate a structure that a foaming agent is uniformly filled between inner elements.
Figure 4B:
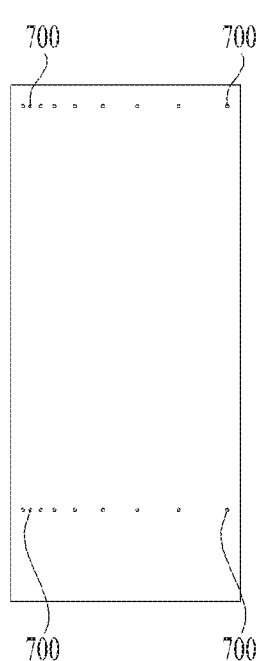
Figure 4C:
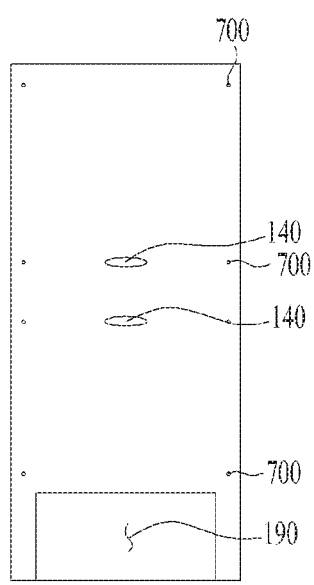

FIGS. 4A-4C illustrate a structure for injection of a foaming agent into the laundry treating apparatus of the present disclosure.

Referring to FIGS. 4A and 4C, the cabinet 100 may include an injection hole 140 on the rear surface to allow the foaming agent to be inject thereinto. At least one or more injection holes 140 may be provided on the rear surface of the cabinet to spray the foaming agent toward the front of the cabinet.

The injection hole 140 may be provided in at least one of a side, an upper surface and a lower surface (if present) of the cabinet 100. However, since the rear surface of the cabinet 100 faces the inner case 200 and the hot-air supply unit 400, the injection hole 140 is preferably provided on the rear surface of the cabinet 100. This is to allow the foaming agent to be uniformly filled in the inner case 20 and the hot-air supply unit 400 without being concentrated on any one region of the inner case 200 and the hot-air supply unit 400.

Meanwhile, if a plurality of the injection holes 14 are provided to be deployed on the rear surface of the cabinet 100, the foaming agent may uniformly be filled in an entire region of the cabinet 100. However, if the plurality of injection holes 140 are provided to be deployed, the esthetic sense may be deteriorated, and inconvenience may occur in that a plurality of separate members for shielding the injection holes 140 are required.

Therefore, the injection holes 140 may be provided to adjoin one another at a center portion of the rear surface of the cabinet 100. Therefore, the foaming agent s may uniformly be supplied to the upper and lower portions of the cabinet 100, and finishing may simply be performed.

Meanwhile, the laundry treating apparatus 10 of the present disclosure may further comprise an interval retainer 170 for retaining an interval between the inner case 200 and the cabinet 100. The interval retainer 170 may be provided as a rib provided along the side of the cabinet, or may be provided in a shape of a rod which is fully in contact with the rear surface of the cabinet and the rear surface of the inner case. The interval retainer 170 may be provided in a single body with the cabinet 100, or may separately be provided by being inserted between the cabinet 100 and the inner case 200.

If the interval retainer 170 is provided, the injection holes 140 may be provided by interposing the interval retainer 170. For example, the injection holes 140 may symmetrically be provided with respect to the interval retainer 170. If the position and the interval of the inner case 200 and the cabinet 100 may be fixed by a jig and the like, the interval retainer 170 may be omitted.

Meanwhile, the foaming agent S needs to be uniformly supplied between the sides of the inner case 200 and the hot-supply unit 400 and the side of the cabinet 100 and between the inner case 200 and the hot-air supply unit 400 as well as a space between the rear surface 200 and the rear surface of the cabinet 100.

Referring to FIG. 4A, the upper surface of the inner case 200, the lower surface of the cabinet 100, the region between the inner case 200 and the hot-air supply unit 400, the sides of the inner case 200 and the hot-air supply unit and the side of the cabinet 100 are provided to be further away from the injection hole 140 than the space between the rear surface of the inner case 200 and the rear surface of the cabinet 100.

Therefore, if the foaming agent S is injected from the foaming agent 140, it may be more difficult to fill the foaming agent S in the upper surface of the cabinet 200, the lower surface of the cabinet 100, the region between the inner case 200 and the hot-air supply unit 400, the sides of the inner case 200 and the hot-air supply unit and the side of the cabinet 100 than the space between the rear surface of the inner case 200 and the rear surface of the cabinet 100.

Referring to FIG. 4B, the laundry treating apparatus 10 of the present disclosure may comprise a plurality of bent holes 700 guiding movement of the foaming agent as the air inside the cabinet is discharged to the side of the cabinet 100 so that the foaming agent S may uniformly be filled in the entire region. In this way, the plurality of bent holes 700 may guide the foaming agent S to enter more deeply to be far away from the injection hole 140 while discharging the air inside the cabinet 100 to the outside.

To this end, the plurality of bent holes 700 may be provided at a denser interval toward the front (opening) of the cabinet 100, or may be more provided at the front than the rear to guide the foaming agent S to reach the side and the front of the cabinet 100.

At this time, more foaming agent S should enter between the upper surface of the cabinet 100 and the upper surface of the inner case 200 and between the inner case 200 and the hot-air supply unit 400 and needs to be filled more certainly. Therefore, the plurality of bent holes 700 are preferably provided in any one of the portion corresponding to the interval between the inner case 200 and the hot-air supply unit 400 and the portion corresponding between the inner case 200 and the upper surface of the cabinet 100.

Meanwhile, even though the foaming agent S is injected from the rear surface of the cabinet 100, the foaming agent S may be injected into the cabinet 100 in a state that the rear surface of the cabinet 100 is toward the upper portion (see FIGS. 5A-5H). Therefore, even though the foaming agent S is injected from the rear surface of the cabinet 100 and filled in the front of the cabinet 100 or the opening 101, it may be difficult to easily attach the foaming agent S to the rear surface of the cabinet 100.

Referring to FIG. 4C, the laundry treating apparatus 10 of the present disclosure may further comprise a plurality of bent holes 700 to allow the foaming agent S to be easily attached to the rear surface of the cabinet 100. Therefore, if the foaming agent S is filled in the cabinet 100 and then heated or swollen by being hardened, the air on the rear surface of the cabinet 100 may be discharged tot eh bent holes 700, whereby the foaming agent S may be filled in the rear surface of the cabinet 100.

At this time, the bent hole 700 may be provided between the upper surface of the cabinet 100 and the upper surface of the inner case 200 and in the position corresponding to the inner case 200 and the hot-air supply unit 400. Therefore, the bent holes 700 may guide the foaming agent S to reach the rear surface of the cabinet 100 while the foaming agent entering the above region is being filled up.

Moreover, the bent holes 700 may be provided at both ends of the rear surface of the cabinet. Therefore, the foaming agent S may be filled in a region where the rear surface of the cabinet 100 and the side of the cabinet 100 adjoin each other.

Meanwhile, the foaming agent S may not easily enter an edge of a region where the injection holes 140 face each other, on the rear surface of the cabinet 100. Therefore, the bent holes 700 may further be provided such that the foaming agent S may enter the above region.

Meanwhile, a withdrawal hole 190 for withdrawing the withdrawal unit 460 may further be provided on the rear surface of the cabinet 100. Since the accommodating body 410 is provided such that its rear is to be in contact with the withdrawal hole 190, the foaming agent S may be prevented from entering the withdrawal hole 190.

Also, as described above, the foaming agent S may be shielded from being filled in the hollow portion 240.

FIGS. 5A-5G illustrate a process of filling the foaming agent S in the laundry treating apparatus 10 of the present disclosure.

Figure 5A:
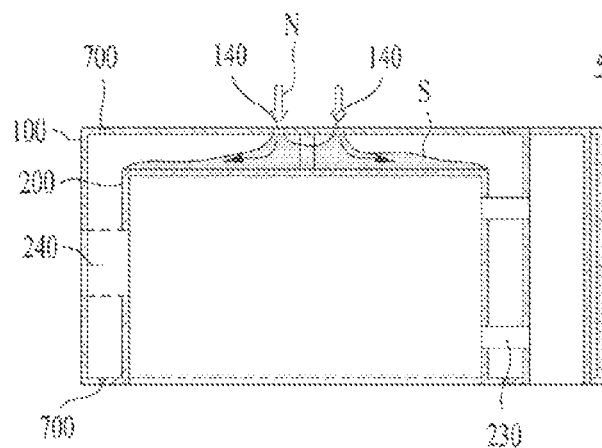
FIGS. 5A, 5B, 5C, 5D, 5E, 5F, 5G, and 5H illustrate a procedure of manufacturing a laundry treating apparatus using a foaming agent.
Figure 5B:
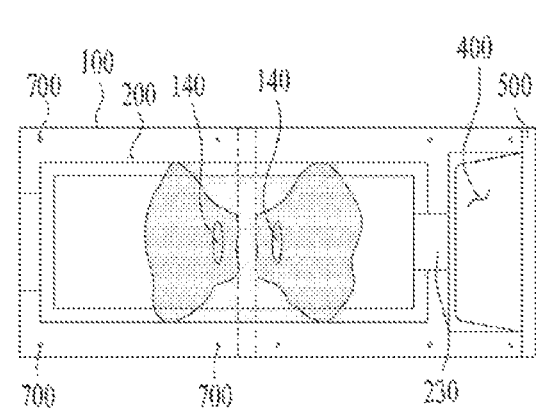
Figure 5C:
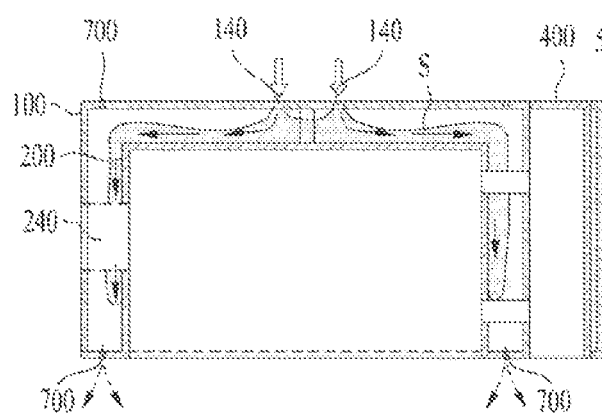
Figure 5D:
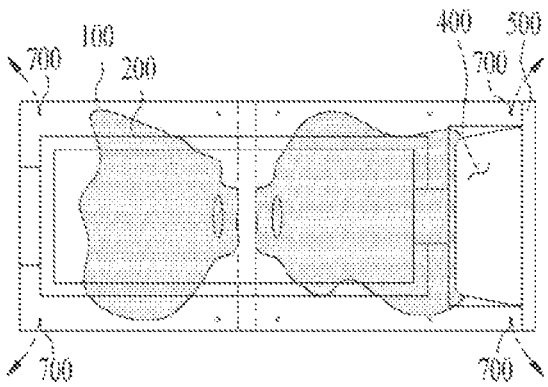
Figure 5E:
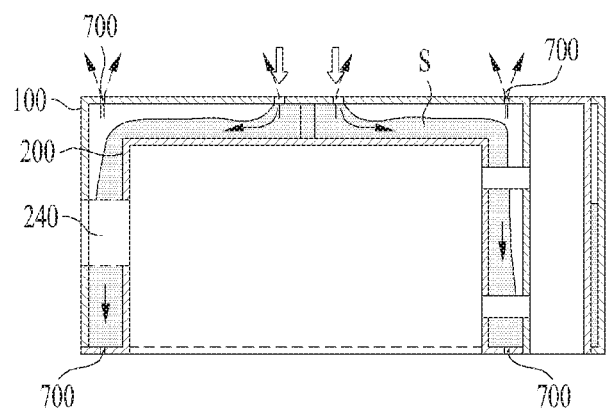
Figure 5F:
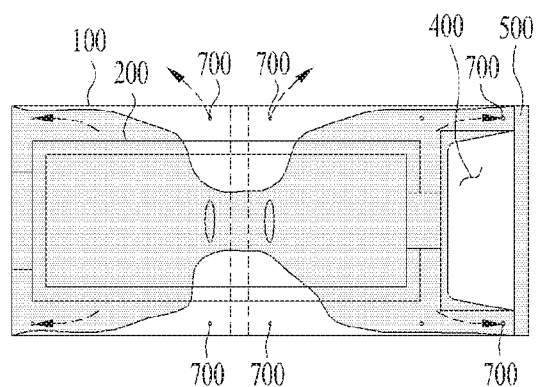

FIGS. 5A, 5C, 5E and 5(G) illustrate sectional views of the laundry treating apparatus 10 of the present disclosure, and FIGS. 5B, 5D, 5F and (5h) illustrate the rear surface of the laundry treating apparatus 10 of the present disclosure.

Referring to FIGS. 5A and 5B, the inner case 200, the hot-air supply unit 400 and the base 500 may be fixed by being inserted into the cabinet 100 in a state that they are coupled to one another. The inner case 200 and the hot-air supply unit 400 may be fixed and coupled to each other through a separate jig.

Afterwards, the foaming agent S may enter the rear surface of the cabinet 100 through the injection holes 140. The foaming agent S may partially move to the lower portion along the side of the inner case 200 while moving along the rear surface of the inner case 200.

Referring to FIGS. 5C and 5B, as the foaming agent S enters through injection holes 140, the air of a volume corresponding to a volume of the foaming agent S gets out through the bent holes 700. Therefore, the foaming agent S may be inserted into an empty space formed by the cabinet 100, the inner case 200 and the hot-air supply unit 400 more actively.

As shown, if the bent holes 700 are provided in the shielding rib 200 provided in the inner case or the prevention rib 430 provided in the hot-air supply unit, the foaming agent S may enter toward the shielding rib 220 and the prevention rib 430 more actively.

Even though the bent holes 700 are not provided in the shielding rib 220 or the prevention rib 430, the foaming agent S may enter toward the shielding rib 220 and the prevention rib 430 by self-load.

Referring to FIGS. 5E and 5F, if the foaming agent S reaches the shielding rib 220 and the prevention rib 430, the foaming agent S may fill the other region while being filled up toward the side or the upper portion (the rear surface of the cabinet) without moving to the lower portion any longer.

If the bent holes 700 are provided on the rear surface of the cabinet 100, the air may be discharged to the bent holes 700 and the foaming agent S may move toward the rear surface of the cabinet 100.

At this time, the foaming agent S may additionally be supplied to be filled up while pushing the air to the bent holes 700 toward the rear surface of the cabinet 100, or may be filled up toward the rear surface of the cabinet 100 while being swollen by being heated or naturally cooled in a state that it is stopped from being additionally supplied.

That is, as the air is intensively discharged to the bent holes 700 provided on the rear surface of the cabinet 100, the foaming agent S is filled up to reach the region where filling is not completed, whereby the empty space may be filled with the foaming agent.

Simultaneously, the foaming agent S may enter the side of the accommodating body 410 and the base 500, whereby the foaming agent S may enter the empty space formed by the accommodating body 410 or the base 500 and the cabinet 100.

Figure 5G:
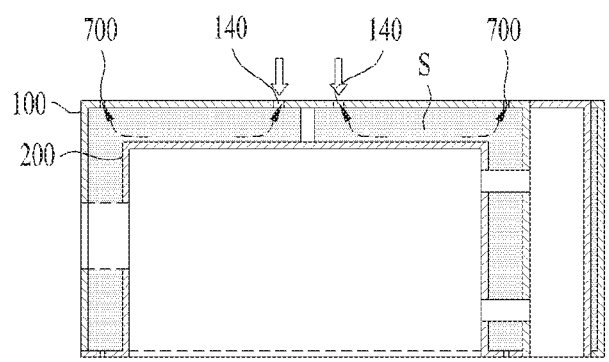
Figure 5H:
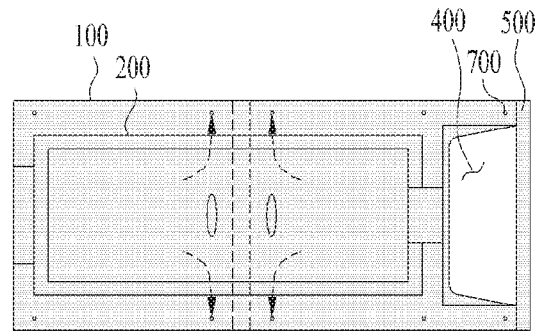

Referring to FIGS. 5G and 5H, if the foaming agent S is heated or swollen by being hardened, or if the foaming agent S is additionally supplied, the foaming agent S may enter a region where filling is not completed on the rear surface of the cabinet 100.

Conventionally, since the foaming agent S may slowly be supplied to a region where corners of the cabinet 100 meet each other or a region where the injection holes 140 face each other, the foaming agent S may finally be filled in the region.

At this time, if the bent holes 700 are provided in the region where corners of the cabinet 100 meet each other or the region where the injection holes 140 face each other, the air inside the cabinet 100 is finally discharged to the bent holes 700, whereby the foaming agent S may completely be filled in the cabinet 100.

Therefore, the foaming agent S may fully be filled in the space formed by the inside of the cabinet 100, the outside of the inner case 200 and the outside of the hot-air supply unit 400. Also, if the foaming agent S is hardened, the inner case 200, the hot-air supply unit 400 and the base 500 may stably be fixed to the cabinet 100.

However, as described above, since the rear surface of the accommodating body 410 is in contact with or coupled to the rear surface of the cabinet 100, inflow and filling of the foaming agent S may be excluded from the region corresponding to the through portion 420. Therefore, the withdrawal unit 460 may be withdrawn to the withdrawal hole 190 provided on the rear surface of the cabinet.

Meanwhile, the foaming agent S may be prevented from being filled in a certain region between the upper surface of the cabinet 100 and the upper surface of the inner case 200, whereby the hollow portion 240 is formed.

The hollow portion 240 may be formed to be provided with a shielding case 241 extended from the inner surface of the cabinet 100 to the inner case 200 or extended from the inner case 200 to the inner surface of the cabinet 100.

Unlike this case, the hollow portion 240 may be generated by a fixture of a jig (not shown) for fixing the cabinet 100 and the inner case 200 during the foaming process, which partially passes through the upper surface of the inner case 200 and the cabinet 100.

Also, the hollow portion 240 may be formed as a jig is provided with a molding article that may be fitted into the upper surface of the cabinet 100 and the upper surface of the inner case 200.

Also, the hollow portion 240 may be generated as a separate housing is inserted between the cabinet 100 and the inner case 200, a foaming agent is injected into the housing, the upper surface of the cabinet 100 is opened after a certain time and then the housing is removed.

As a result, the laundry treating apparatus of the present disclosure may simplify the assembly process by omitting the frame by the foaming agent S and make sure of durability and insulation property.

Figure 6:
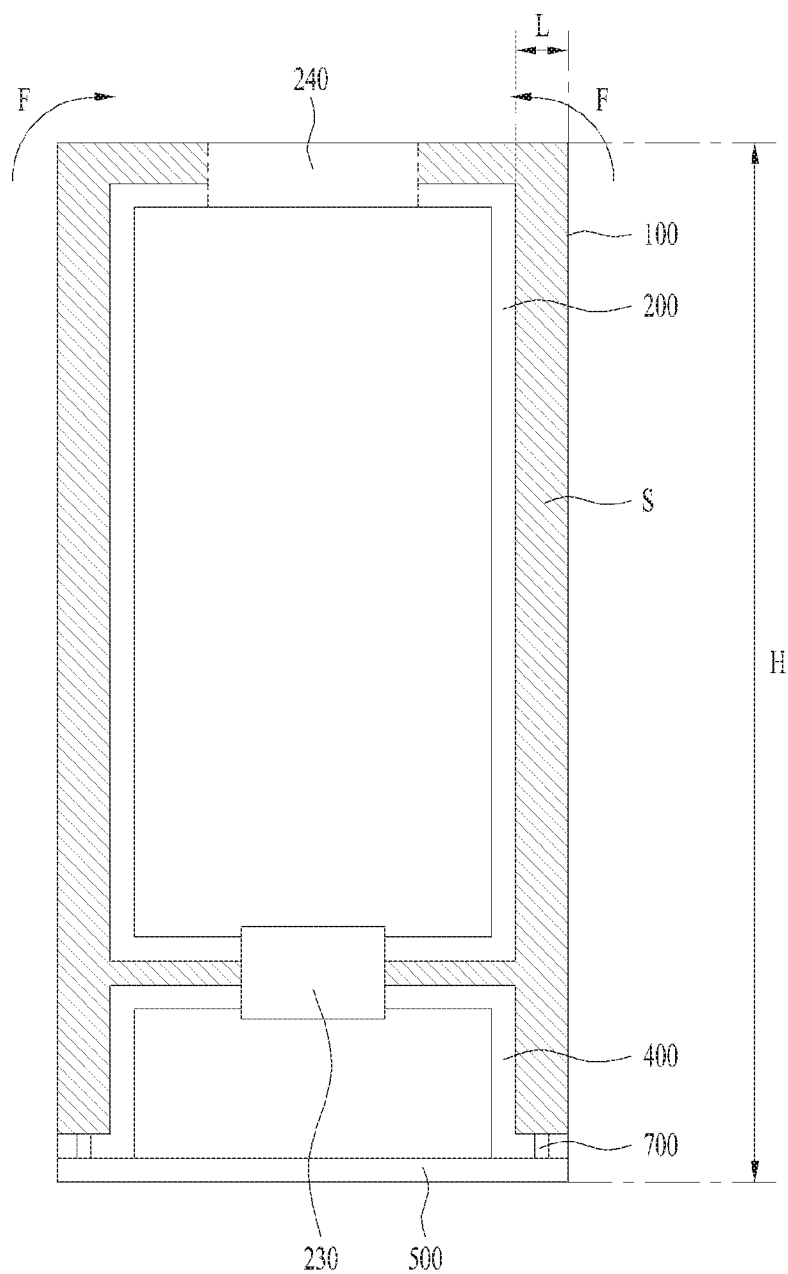
FIG. 6 illustrates a structure that deformation may occur when the inside of a laundry treating apparatus is filled with a foaming agent.

FIG. 6 illustrates a sectional view of a laundry treating apparatus in which the process of FIGS. 5A-5G is completed.

Referring to FIG. 6, the inside of the cabinet 100 and the space between the inner case 200 and the hot-air supply unit 400 may be filled with the foaming agent S.

As the foaming agent S is filled in the space where the frame is provided, the frame may be omitted, whereby the assembly process of the frame and the coupling process of the frame, the cabinet and the inner case may be omitted.

Meanwhile, unlike a refrigerator, the laundry treating apparatus of the present disclosure does not need perfect insulation, and does not need a thick thickness L to make sure of a maximum volume of an inner accommodating space.

Also, the laundry treating apparatus of the present disclosure may have a height H longer than that of the refrigerator to accommodate laundry in the accommodating space without folding.

In this case, if the inside of the cabinet 100 is only filled with the foaming agent S, the foaming agent S is relatively thin and long, whereby durability may be deteriorated. Also, the foaming agent S thinly filled with a long length may have a variable shape due to a force bent when the foaming agent is hardened.

In order to enhance or maintain durability and rigidity of the foaming agent S, the laundry treating apparatus of the present disclosure may integrally fill the foaming agent S in a horizontal space between the inner case and the hot-air supply unit as well as a vertical space among the side of the cabinet and the side of the inner case and the hot-air supply unit.

In this way, since the foaming agent S is integrally filled in a width direction inside the laundry treating apparatus as well as a height direction of the laundry treating apparatus, stability of the foaming agent S may be ensured structurally. Therefore, rigidity and strength of the laundry treating apparatus as well as the foaming agent S may be enhanced.

Therefore, even though external impact is transferred to the cabinet 100 or strong vibration is generated inside the cabinet 100, since the foaming agent S is tightly fixed in a shape of 'H', the foaming agent S may be prevented from being damaged or deformed.

Meanwhile, since the foaming agent S serves to fix the inner case 200 and the hot-air supply unit 400 and maintain a shape and rigidity of the laundry treating apparatus 10, the foaming agent S may sufficiently be filled in only the sides (including the rear surface) of the inner case 200 and the hot-air supply unit 400.

Moreover, since the excitation unit 300 may be provided on the upper surface of the inner case 200, the hollow portion 240 needs to be provided on the inner case 200 as described above.

Also, the base 500 or the withdrawal unit 460 may be withdrawn to the outside if necessary, and if the foaming agent S is filled in the lower portion of the cabinet 100, leveling of the cabinet 100 may not be maintained depending on a hardened shape of the foaming agent. Therefore, it may be more efficient that the foaming agent S is omitted in the lower portion of the cabinet 100.

Also, if the foaming agent S is condensed during its hardening process, a bent force F occurs at both ends of the foaming agent, whereby a problem may occur in that a shape of the inner case 200 or the base 500 is varied.

Therefore, in the laundry treating apparatus 10 of the present disclosure, the foaming agent S may not enter a certain region of the upper portion of the inner case 200 and the lower portion of the base 500.

As a result, the foaming agent S may be provided in a structure of H in which a certain region of the upper portion and the lower portion inside the laundry treating apparatus is opened, whereby arrangement of the excitation unit 300 or withdrawal of the heat pump 465 may easily be performed.

Figure 7:
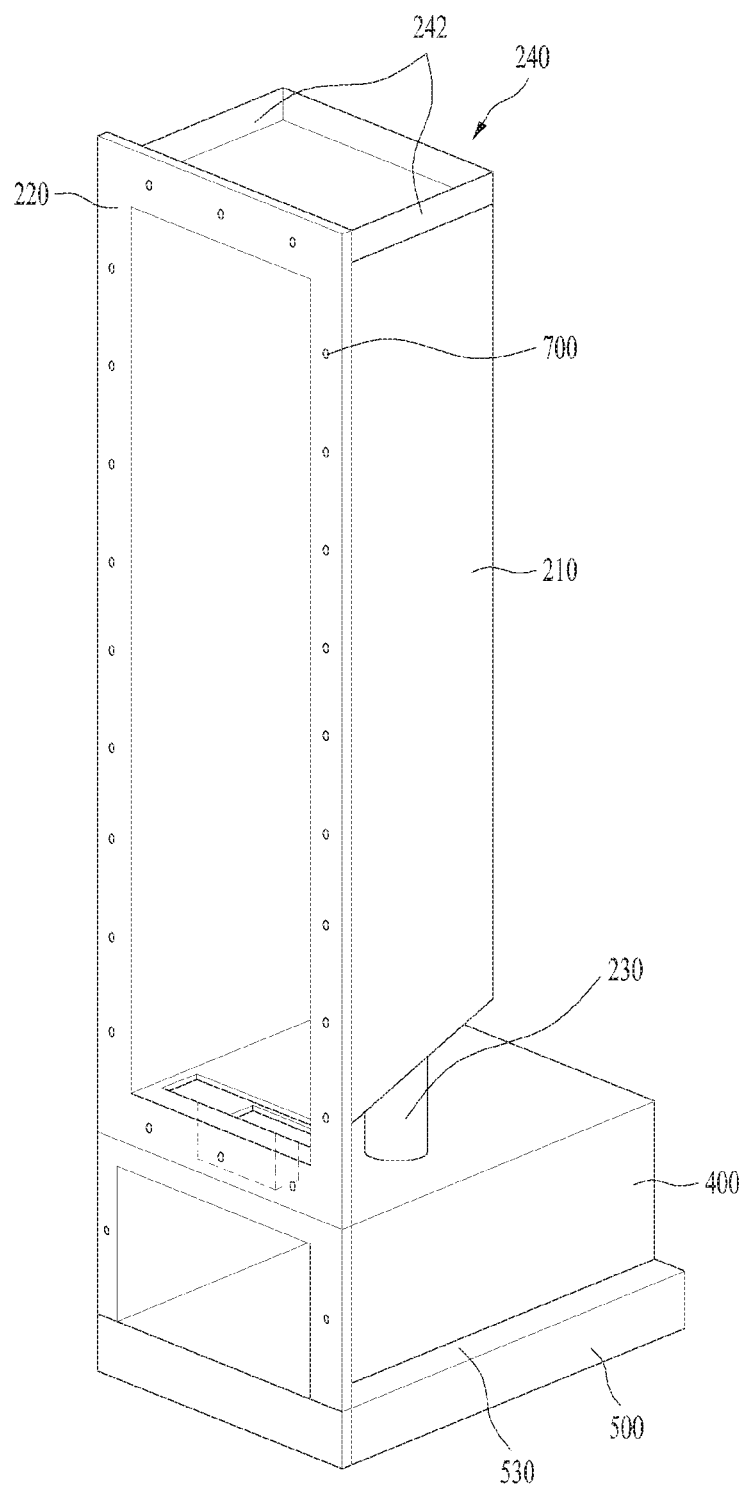
FIG. 7 illustrates an embodiment that may maintain a shape and avoid interference between inner elements even though the inside of a laundry treating apparatus is filled with a foaming agent.

FIG. 7 illustrates another embodiment of the laundry treating apparatus 10 of the present disclosure, wherein the foaming agent S is prevented from entering the upper portion of the inner case 200 and the lower portion of the base 500.

In the same manner as the previous embodiment, the inner case 200 may include a hollow portion 240 that makes sure of a space where the hanging unit 300 is provided on the upper surface and prevents the foaming agent S from being in contact with the hanging unit 300.

However, the hollow portion 240 of the laundry treating apparatus shown in FIG. 7 may be generated as a shielding rib 242 provided between an upper corner of the inner case 200 and the upper surface of the cabinet.

That is, the shielding rib 242 may be provided to be in contact with the upper corner of the inner case 200 and the upper surface of the cabinet 100 provided at an upper portion of the upper corner. Also, the shielding rib 242 may be provided to be extended from the upper corner of the inner case 200 to be in contact with the upper surface of the cabinet 100.

Therefore, the foaming agent S entering from the injection holes 140 may be fundamentally prevented from entering the upper surface of the inner case 200 due to the shielding rib 242.

Also, the base 500 of the laundry treating apparatus 10 may further include a leakage prevention unit 530 further extended from the portion for supporting the accommodating body 410 to the side of the cabinet to prevent the foaming agent entering the cabinet from leaking out to the lower portion of the cabinet 100.

In other words, the leakage prevention unit 530 may be in contact with an inner circumferential surface of a bottom surface of the cabinet 100 to prevent the foaming agent S from leaking out to the cabinet 100. As a result, the foaming agent S may be fundamentally prevented from entering the lower surface of the base 500. The cabinet 100 may not include a bottom surface due to the base 500.

Moreover, the base 500 may be extended to be in contact with the lower end of the cabinet 100 and provided to substitute for the bottom surface of the cabinet 100. That is, the cabinet 100 may be provided to be seated on the leakage prevention unit 530 of the base 400.

Figure 8A:
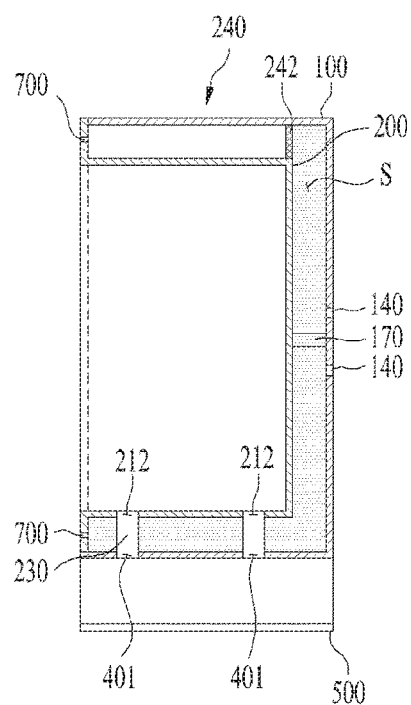
FIGS. 8A, 8B, and 8C illustrate an inner structure of a laundry treating apparatus when a foaming agent is completely filled.
Figure 8B:
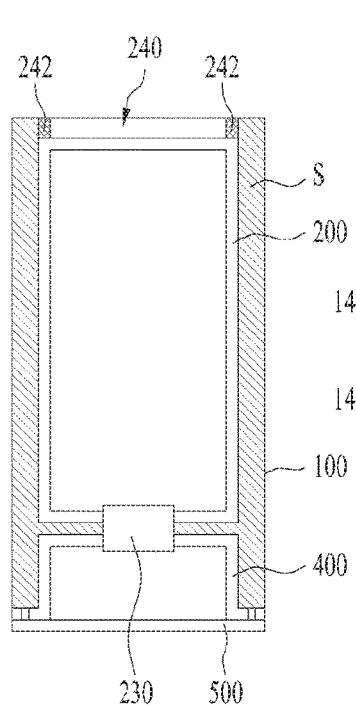
Figure 8C:
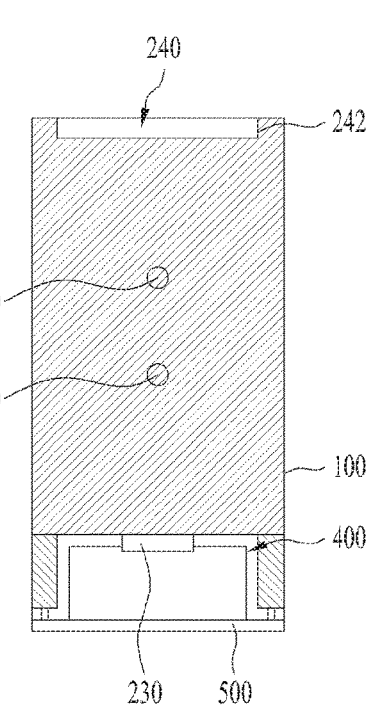

FIGS. 8A-8C illustrate a structure that the foaming agent S is filled in the laundry treating apparatus of FIG. 7.

FIG. 8A illustrates a side sectional view of the laundry treating apparatus 10, FIG. 8B illustrates a front view of the laundry treating apparatus 10, and FIG. 8C illustrates a rear view of the laundry treating apparatus 10.

Referring to FIGS. 8A and 8B, the foaming agent S may be provided to be filled in the other region except the upper portion of the inner case 200 and the lower portion of the base 500. Therefore, the space where the excitation unit 300 may be provided may be ensured, and the upper portion of the inner case 200 or the lower portion of the base may be prevented from being inwardly bent when the foaming agent S is hardened.

Consequently, referring to FIG. 8B, the foaming agent of another embodiment of the laundry treating apparatus 10 according to the present disclosure may be provided in a shape of 'H' to be filled in the cabinet. Therefore, heat inside the inner case 200 may be prevented from leaking out to the side or the rear surface of the cabinet 100 and may maintain basic rigidity, and at the same time may prevent shapes of the upper portion and the lower portion of the cabinet 100 from being deformed or prevent an unnecessary compressive force from occurring.

Also, referring to FIG. 8C, the foaming agent S may be excluded from the region where the withdrawal unit 460 is withdrawn, due to the base 500 and the through portion 420 of the accommodating body 410.

Figure 9:
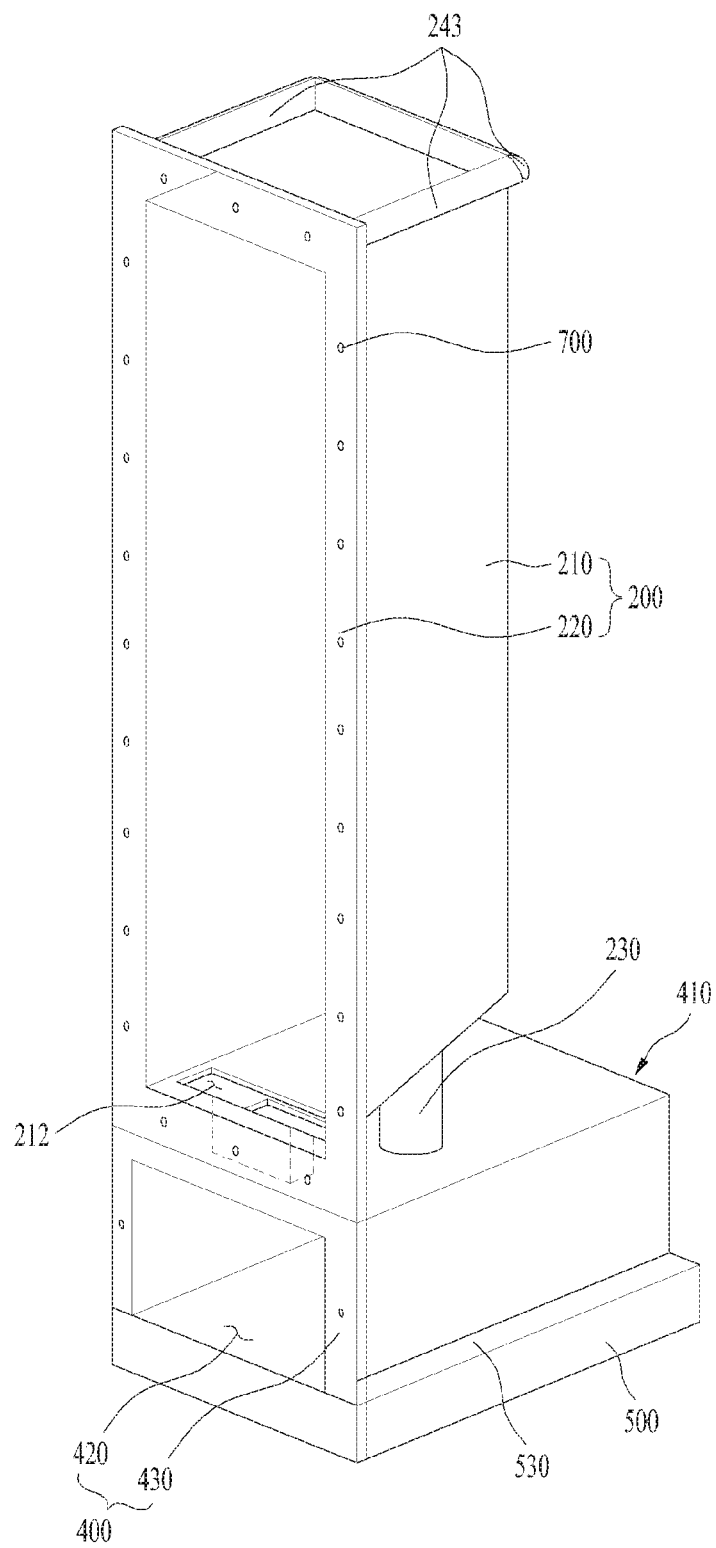
FIG. 9 illustrates another embodiment that may maintain a shape and avoid interference between inner elements even though the inside of a laundry treating apparatus is filled with a foaming agent.

FIG. 9 illustrates another embodiment of the laundry treating apparatus 10.

The hollow portion 240 may be generated as a shielding vane 243 extended from the upper corner of the inner case 200 to the side of the cabinet 100 to shield the foaming agent S from entering the upper surface of the inner case.

In detail, the shielding vane 243 may be provided to be extended from the corner except the shielding rib 220 of each corner of the upper surface of the inner case 200 to be far away from the inner case 200 and thus provided to be in contact with the inside of the cabinet 100.

Therefore, the shielding vane 243 may fundamentally shield the foaming agent S entering from the injection holes 140 from being in contact with the upper surface of the inner case 200, and may make sure of a wider space at the upper portion of the inner case 200 to facilitate arrangement of the hanging unit 300.

Moreover, the shielding vane 243 may be provided to be upwardly convex unlike the shielding rib 242, thereby accommodating a portion of the foaming agent S. A cohesion of the shielding vane 243 and the foaming agent S may be enhanced, whereby the foaming agent S may be guided to be rigidly coupled and attached with the inner case 200.

Meanwhile, the laundry treating apparatus of the present disclosure may further comprise a plurality of bent holes 700 guiding the foaming agent to move to the shielding vane 243 and to be in contact with the shielding vane by passing through the shielding vane 243.

That is, since the shielding vane 243 is extended from the upper surface of the inner case 200 toward the outside, the lower end of the shielding vane 243 is provided to be in contact with the foaming agent S. Therefore, the bent holes 700 may be provided on the shielding vane 243 to guide the foaming agent S to easily enter the shielding vane 243 by discharging the air inside the cabinet 100 to the shielding vane 243.

The bent holes 700 may be provided in a plural number along a length direction of the shielding vane 243.

Figure 10A:
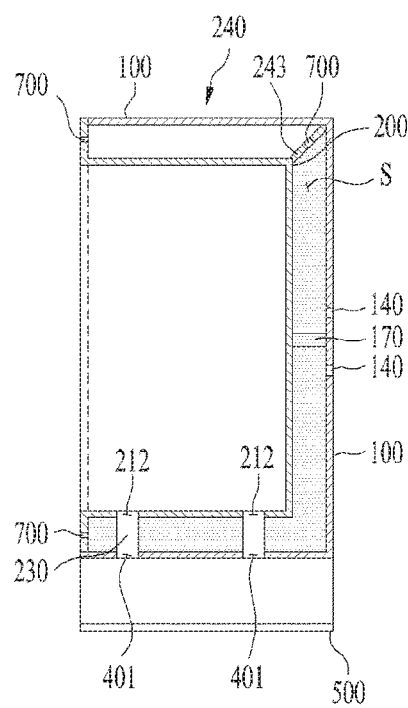
FIGS. 10A, 10B, and 10C illustrate an inner structure of a laundry treating apparatus when a foaming agent is completely filled.
Figure 10B:
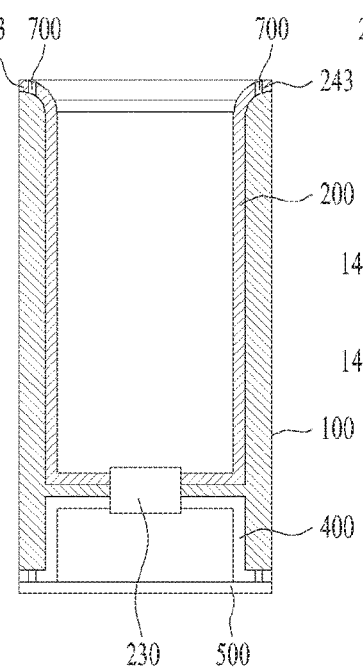
Figure 10C:
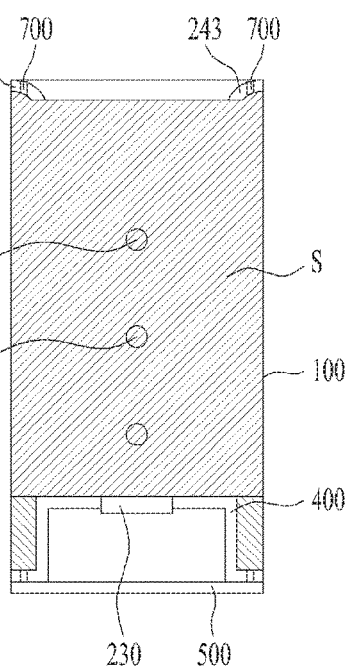

FIGS. 10A-10C illustrate that the foaming agent S is filled in the laundry treating apparatus 10 comprising the shielding vane 243.

Referring to FIG. 10A, it is noted that the foaming agent S enters the shielding vane 243 due to the bent holes 700 provided in the shielding vane 243. Also, the empty space may be more enlarged on the upper surface of the inner case 200, whereby the hanging unit 300 may easily be arranged and repaired.

Referring to FIGS. 10B and 10C, the foaming agent S may be provided inside the cabinet in a shape of H due to the shielding vane 243 and the base 500. Moreover, the shielding vane 243 may be more rigidly coupled with the foaming agent S by accommodating the upper end of the foaming agent S.

Also, even though a contractile force of the foaming agent S toward the inner case 200 is generated, the shielding vane 243 may support inner stress by dispersing the above force along an area. As a result, durability and arrangement stability of the laundry treating apparatus 10 may be more improved.

Meanwhile, in all embodiments of the laundry treating apparatus of the present disclosure, if the thickness of the foaming agent S is thick, it may be favorable to make sure of rigidity and maintain a shape, however, a problem may occur in that the inner space becomes narrow. Also, if the thickness of the foaming agent S is thin, the accommodating space of the hot-air supply unit 400 and the inner case 200 may be widened, however, a problem may occur in that rigidity becomes weak.

Also, the laundry treating apparatus 10 of the present disclosure may be provided to be relatively higher than a home appliance such as a refrigerator due to the presence of the hot-air supply unit 400 provided at the lower portion, and it is required to determine a thickness range of the foaming agent S that may support the laundry treating apparatus.

As an experimental result, it is noted that a ratio of the height of the laundry treating apparatus 10 of the present disclosure and the thickness of the foaming agent S should be greater than 60 and smaller than 95 to make sure of minimum rigidity.

For example, if the height of the laundry treating apparatus 10 is 1870 mm, the thickness of the foaming agent S is preferably provided between 20 mm and 30 mm.

In detail, if the ratio of the height of the laundry treating apparatus 10 and the thickness of the foaming agent S is smaller than 60, since it means that the foaming agent S is too thick, a minimum space where the heat pump 450 is provided is limited, whereby the laundry treating apparatus 10 may not be manufactured.

Also, if the ratio of the height of the laundry treating apparatus 10 and the thickness of the foaming agent S is greater than 93, since it means that the foaming agent S is too thin, minimum rigidity is not maintained, whereby the foaming agent S may be pulverized by self-load of the laundry treating apparatus 10.

Therefore, if the ratio of the height of the laundry treating apparatus 10 and the thickness of the foaming agent S is greater than 61 and smaller than 93, it may mean a minimum essential range that allows the laundry treating apparatus 10 of the present disclosure to be normally manufactured and operated.

At this time, the thickness of the foaming agent S may correspond to the interval between the side of the inner case 200 and the side of the cabinet 100 or the interval between the rear surface of the inner case 200 and the rear surface of the cabinet 100.

Also, the thickness of the foaming agent S may correspond to the interval between the side of the hot-air supply unit 400 and the side of the cabinet 100.

Therefore, the inner case 200 and the hot-air supply unit 400 may be provided to be spaced apart from the cabinet 100 as much as an interval corresponding to 1/90 to 1/60 of a total height of the cabinet 100.

Figure 11:
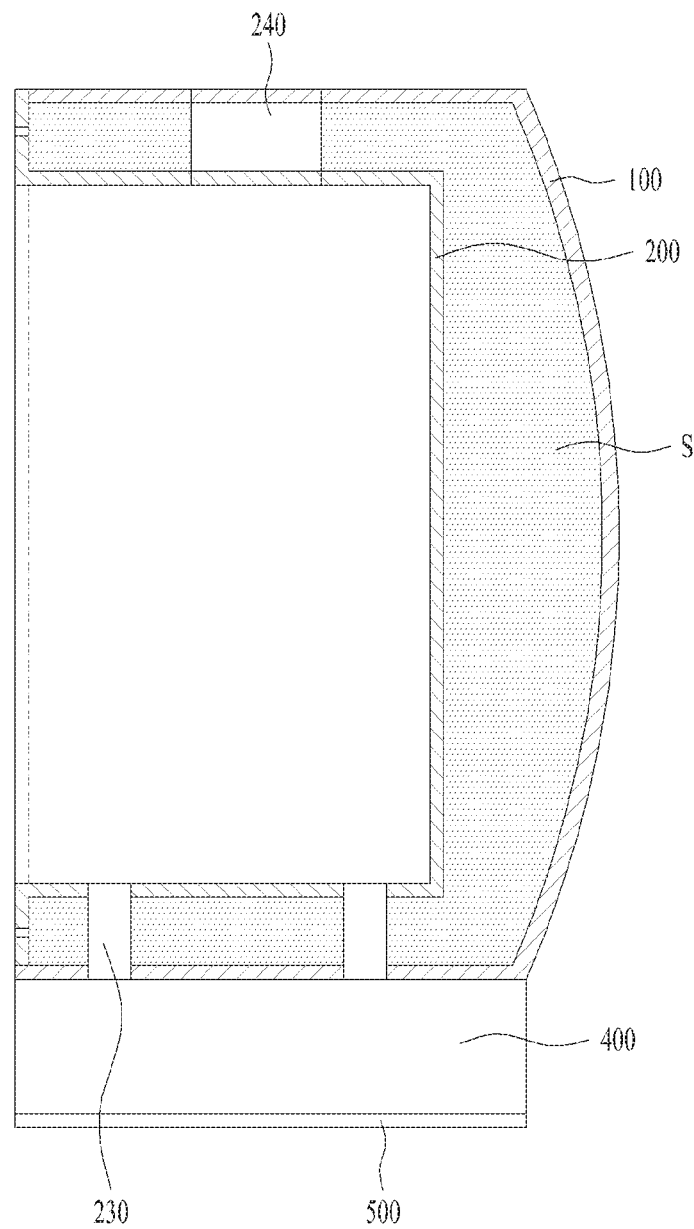
FIG. 11 illustrates the possibility of a cabinet of a laundry treating apparatus of the present disclosure, which may be deformed by a foaming agent.

FIG. 11 illustrates that the cabinet 100 of the laundry treating apparatus 10 of the present disclosure is bent by an external force.

In the laundry treating apparatus 10 of the present disclosure, since the height of the accommodating space is high to accommodate laundry in the inner case 200 without folding the laundry and the hot-air supply unit 400 is also arranged at the lower portion of the inner case 200, the height of the cabinet 100 is provided to be higher than those of the other home appliances. Therefore, the rear surface and the side of the cabinet 100 may have rigidity or strength which is relatively vulnerable, and may easily be bent by an external force.

Meanwhile, the foaming agent S is filled in the empty space of the cabinet 100 while its volume is being expanded in the middle of a heating process or a hardening process if the foaming agent is completely injected into the cabinet 100. Therefore, even though the foaming agent S is not injected into the entire region inside the cabinet 100, the foaming agent S may be filled in the entire region inside the cabinet 100 while being expanded in the middle of the hardening process.

However, if strength or rigidity of the cabinet 100 is not sufficient in the middle of filling the foaming agent S, which is expanded, in the cabinet 100, the cabinet 100 may be deformed by an expansion force of the foaming agent S.

Referring to FIG. 11, when the foaming agent S completely enters the inside of the cabinet 100 and is expanded during the hardening process and then filled in the empty space, the cabinet 100 may be swollen by the expansion force of the foaming agent S.

Particularly, since the rear surface or the side of the cabinet 100 is provided to be relatively longer than the upper surface, it may be more seriously swollen due to vulnerable rigidity.

If the cabinet 100 is swollen, problems occur in that an esthetic sense is deteriorated, the space occupied by the laundry treating apparatus 10 is unnecessarily enlarged, and the foaming agent S does not reach an intended region.

Therefore, strength or rigidity required for the cabinet 100 may become great in case of the laundry treating apparatus 10 of the present disclosure, in which the frame is replaced with the foaming agent S.

Figure 12:
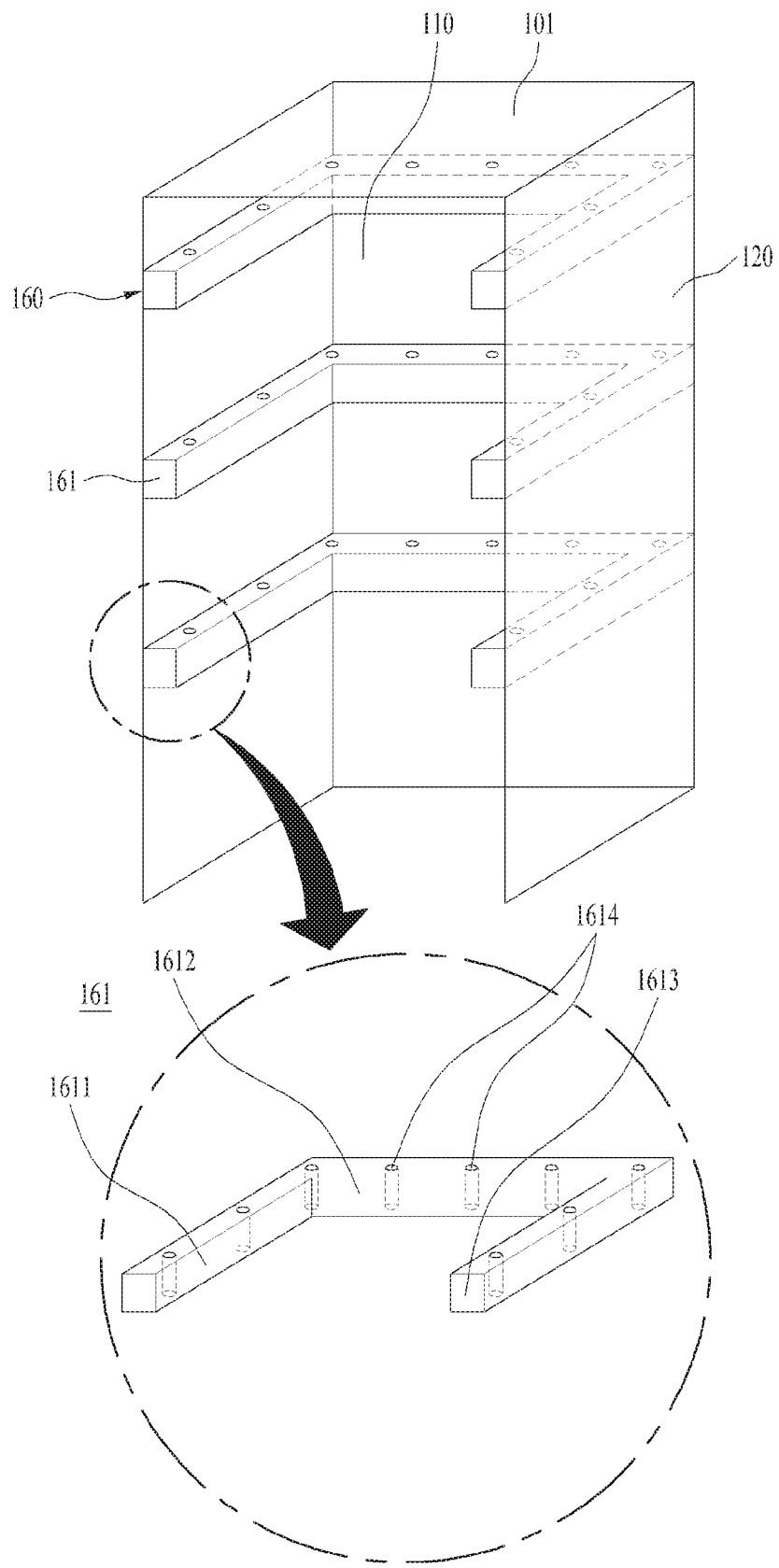
FIG. 12 illustrates a structure of a deformation prevention unit that may prevent deformation of a cabinet from occurring.

FIG. 12 illustrates an embodiment that strength or rigidity of the cabinet 100 may be enhanced.

Referring to FIG. 12, the laundry treating apparatus 10 of the present disclosure may further comprise a deformation prevention unit 160 provided on or coupled to the inner circumferential surface of the cabinet 100 to fix the inner case 200 to the hot-air supply unit 400 and maintain the shape of the cabinet 100 even though the foaming agent filling the empty space is expanded.

The deformation prevention unit 160 may include a width coupling unit 161 coupled with both sides 120 of the cabinet 100 in a width direction of the rear surface 110 to prevent bending of the cabinet 100 from occurring.

The width coupling unit 161 may be provided in a shape of '-' or 'C' and fully coupled to the inner circumferential surface of the cabinet 100 along a width direction. The width coupling unit 161 may be provided in a rectangular section to make sure of a maximum contact area with the cabinet 100 and maintain rigidity.

The width coupling unit 161 may include a first coupling unit 1611 having one side 120 coupled with the cabinet, a second coupling unit 1612 extended from one end of the first coupling unit 1611 and coupled to the rear surface 110 of the cabinet, and a third coupling unit 1613 coupled to the other side 120 of the cabinet at one end of the second coupling unit 1612.

The first coupling unit 1611, the second coupling unit 1612 and the third coupling unit 1613 may be provided in a rod shape at a length corresponding to each side of the cabinet 100.

The first coupling unit 1611, the second coupling unit 1612 and the third coupling unit 1613 may be coupled to one another by being welded on the inner surface of the cabinet 100, or may be coupled through a coupling member such as a separate bolt or nut, or may be coupled by forcible fitting and the foaming agent S.

Meanwhile, the first coupling unit 1611, the second coupling unit 1612 and the third coupling unit 1613 may be provided at a thickness which is not in contact with the inner case 200 to prevent the foaming agent S injected into the cabinet 100 from moving.

Also, the width coupling unit 161 may further include a plurality of guide holes 1614 provided to move the foaming agent inside the cabinet 100 even though the foaming agent S is in contact with the inner case. That is, the guide holes 1614 may be provided in a plural number along a length direction of the first coupling unit 1611, the second coupling unit 1612 and the third coupling unit 1613, and may be provided in a diameter greater than that of the bent hole 700 such that the foaming agent S may enter there and move.

Since the guide holes 1614 is provided so as not to restrict movement of the foaming agent S, the guide holes 1614 are preferably provided to pass through the first coupling unit 1611, the second coupling unit 1612 and the third coupling unit 1613 in a height direction of the cabinet 100.

Meanwhile, if the foaming agent S enters the inside of the guide holes 1614, a cohesion between the foaming agent S and the cabinet 100 may be more improved to prevent the cabinet 100 from being randomly bent.

In this way, the width coupling unit 161 may fully be coupled to the inner circumferential surface of the cabinet 100 to support the cabinet 100, whereby any one of the rear surface 110 and the side 120 of the cabinet 100 may be prevented from being randomly expanded or bent.

Since a portion of the cabinet 100, which corresponds to a center based on a height direction, is most vulnerable, the width coupling unit 161 may be provided to be coupled to the center portion based on the height direction of the cabinet 100. However, the width coupling unit 161 may be provided in a plural number such that the coupling units 161 may be spaced apart from one another along the height direction of the cabinet 100 if necessary.

Meanwhile, the injection holes 140 may be provided to be spaced apart from the width coupling unit 161. Therefore, the foaming agent S may be injected without disturbance due to the width coupling unit 161. If the plurality of width coupling units 161 are provided, the injection holes 140 may be provided between the respective width coupling units 161.

Figure 13:
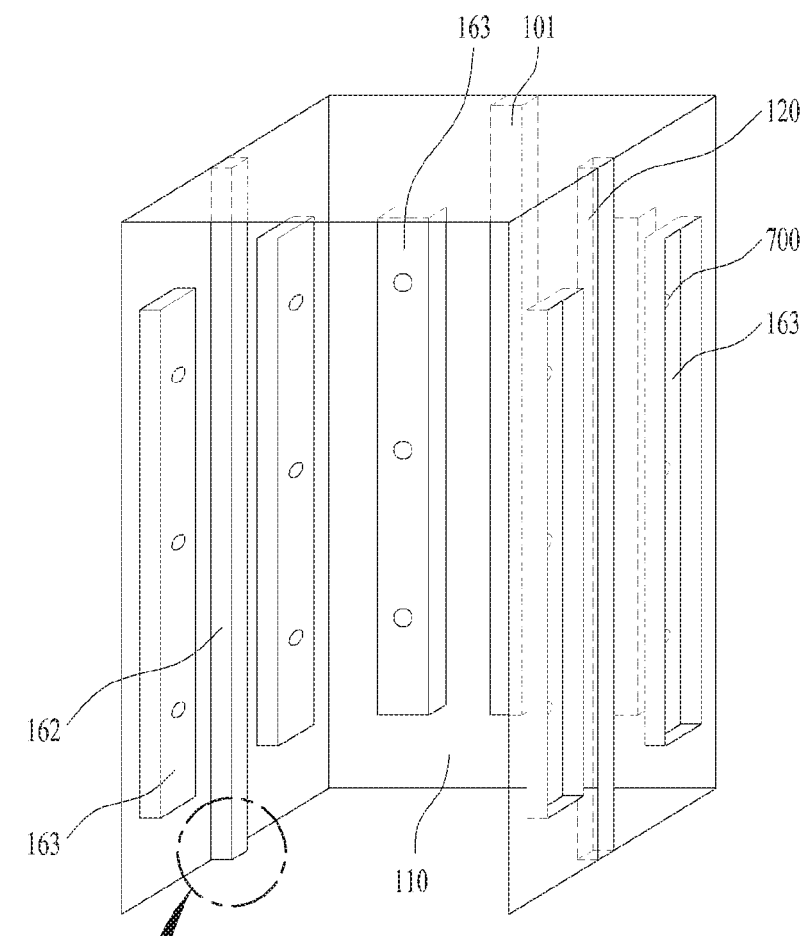
FIG. 13 illustrates another structure of a deformation prevention unit that may prevent deformation of a cabinet from occurring.
Figure 13:
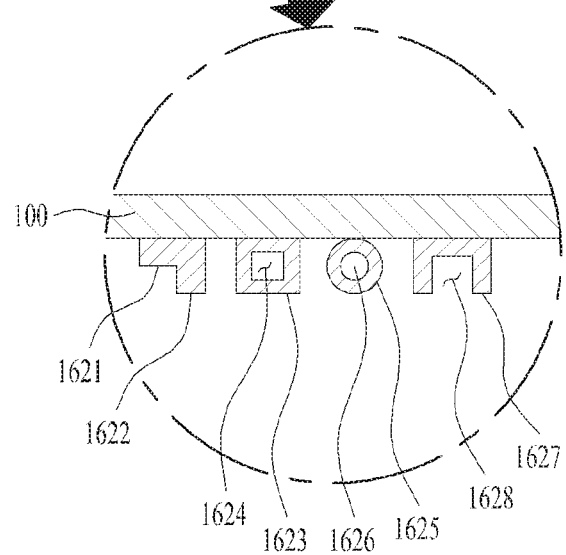

FIG. 13 illustrates another embodiment of a deformation prevention unit that may enhance strength or rigidity of the cabinet 100.

Referring to FIG. 13, the deformation prevention unit of the present disclosure may include concave and convex portions 163 recessed or protruded along the height direction of the cabinet 100.

The concave and convex portions 163 may be manufactured in such a way of forming a stereoscopic effect on the surface of the cabinet 100 by press molding the cabinet 100 after manufacturing the cabinet 100.

If the concave and convex portions 163 are provided to be recessed from one surface of the cabinet 100, the concave and convex portions 163 are preferably provided at a depth that may prevent the foaming agent S from being in contact with the inner case 200, so as not to disturb movement of the foaming agent S. In detail, since the concave and convex portions 163 are provided to enhance rigidity of the cabinet 100, the concave and convex portions 163 may be provide at a depth or height of 2 mm to 5 mm.

Also, the concave and convex portions 163 may prevent the cabinet 100 provided longitudinally in the height direction from being bent.

Since the height is provided to be longer than the width, at least one or more concave and convex portions 163 may be provided on the side 120 of the cabinet and the rear surface 110 of the cabinet. However, in order to enhance rigidity, the concave and convex portions 163 are preferably provided on the side 120 and the rear surface 110 of the cabinet.

Meanwhile, the concave and convex portions 163 are protruded or recessed, whereby the foaming agent S may not be easily in contact with the inner case when the foaming agent S enters there. In order to avoid this, the concave and convex portions 163 may be provided with a plurality of bent holes 700 through which the air inside the cabinet 100 is discharged.

Also, the deformation prevention unit 160 may include a height coupling unit 162 coupled along the height direction of the cabinet 100 to prevent the cabinet from being bent.

The height coupling unit 162 may be coupled to the inner surface of the cabinet 100 in the height direction to enhance rigidity of the cabinet 100, thereby preventing the cabinet 100 from being bent outwardly or inwardly.

One or more height coupling units 162 may be provided by being welded on the side 120 or the rear surface 110 of the cabinet 100, or may be coupled by a separate coupling member. Also, the height coupling units 162 may be provided to be spaced apart from each other on the side 120 and the rear surface 110 of the cabinet 100, or may be provided to be coupled to the side 120 and the rear surface 110 of the cabinet one by one.

That is, there is no limitation in the number of the height coupling units 162 and the position of the height coupling units 162 if the shape of the cabinet 100 may be maintained.

Meanwhile, as shown, the height coupling units 162 and the concave and convex portions 163 may be provided together. That is, the height coupling units 162 may be provided between the concave and convex portions 163 to certainly prevent the shape of the cabinet 100 from being deformed.

However, if one height coupling unit 162 and one concave and convex portion may be provided to sufficiently prevent the cabinet 100 from being bent, the cabinet 100 may be provided in any one of the height coupling unit 162 and the concave and convex portion 163.

Meanwhile, although FIG. 13 illustrates that the height coupling units 162 provided in various shapes are coupled to the cabinet 100, this is only for description, and the height coupling units 162 may be coupled in one unified shape.

The height coupling units 162 may include a contact rib 1621 contacted along the height direction of the rear surface 110 or the side 120 of the cabinet, and an extension rib 1622 enhancing rigidity of the contact rib 1621.

The extension rib 1622 may be provided in a single body with the contact rib 1621 to prevent the contact rib 1621 from being bent, and may enhance a cohesion with the foaming agent S by enlarging a contact area with the foaming agent S.

As a result, the height coupling units 162 may prevent the cabinet 100 from being bent and maintain a cohesion with the foaming agent S.

The height coupling units 162 may include a contact duct 1623 contacted along the height direction of the rear surface 110 or the side 120 of the cabinet, and a reinforcing hole 1624 provided inside the contact duct 1623.

The contact duct 1623 may be provided in a rectangular section to make sure of an area which is in contact with the cabinet 100, and may maintain its rigidity to prevent the cabinet 100 from being bent. The reinforcing hole 1624 may be provided inside the contact duct 1623 to reduce a weight of the contact duct 1623 and enhance durability of the contact duct.

Also, the height coupling units 162 may include a contact pipe 1625 contacted along the height direction of the rear surface 110 or the side 120 of the cabinet, and a hollow hole 1626 provided inside the contact pipe. The contact pipe 1625 is grounded with the cabinet 100 by a line, and thus may minimize an area coupled with the cabinet 100.

As a result, the even though a process of coupling the contact pipe 1625 with the cabinet 100 through welding is simplified, the cabinet 100 may sufficiently be prevented from being bent.

Also, the height coupling units 162 may include a contact zone 1626 contacted along the height direction of the rear surface 110 or the side 120 of the cabinet, and a guide rib 1627 extended from both ends of the contact zone 1626 toward the inner case and coupled with the foaming agent.

The contact zone 1626 may sufficiently make sure of an area contacted with the cabinet 100 to prevent the cabinet 100 from being bent. Also, the guide rib 1627 may include an accommodating groove 1628 therein, which may be coupled with the foaming agent S, to enhance a contact force with the foaming agent S, and may prevent the contact zone 1626 from being bent, thereby certainly preventing the cabinet 100 from being bent.

As a result, in the laundry treating apparatus 10 of the present disclosure, even though the foaming agent S generates an expansion force in a state that it enters the inside of the cabinet 100, the shape of the cabinet 100 may be maintained. Therefore, the foaming agent S may completely be filled in the empty space of the cabinet.

Meanwhile, although the aforementioned deformation prevention unit 160 is provided inside the cabinet 100 as shown, the deformation prevention unit 160 may be coupled to the outside of the cabinet 100 to fundamentally shield the cabinet 100 from being externally swollen.

Figure 14:
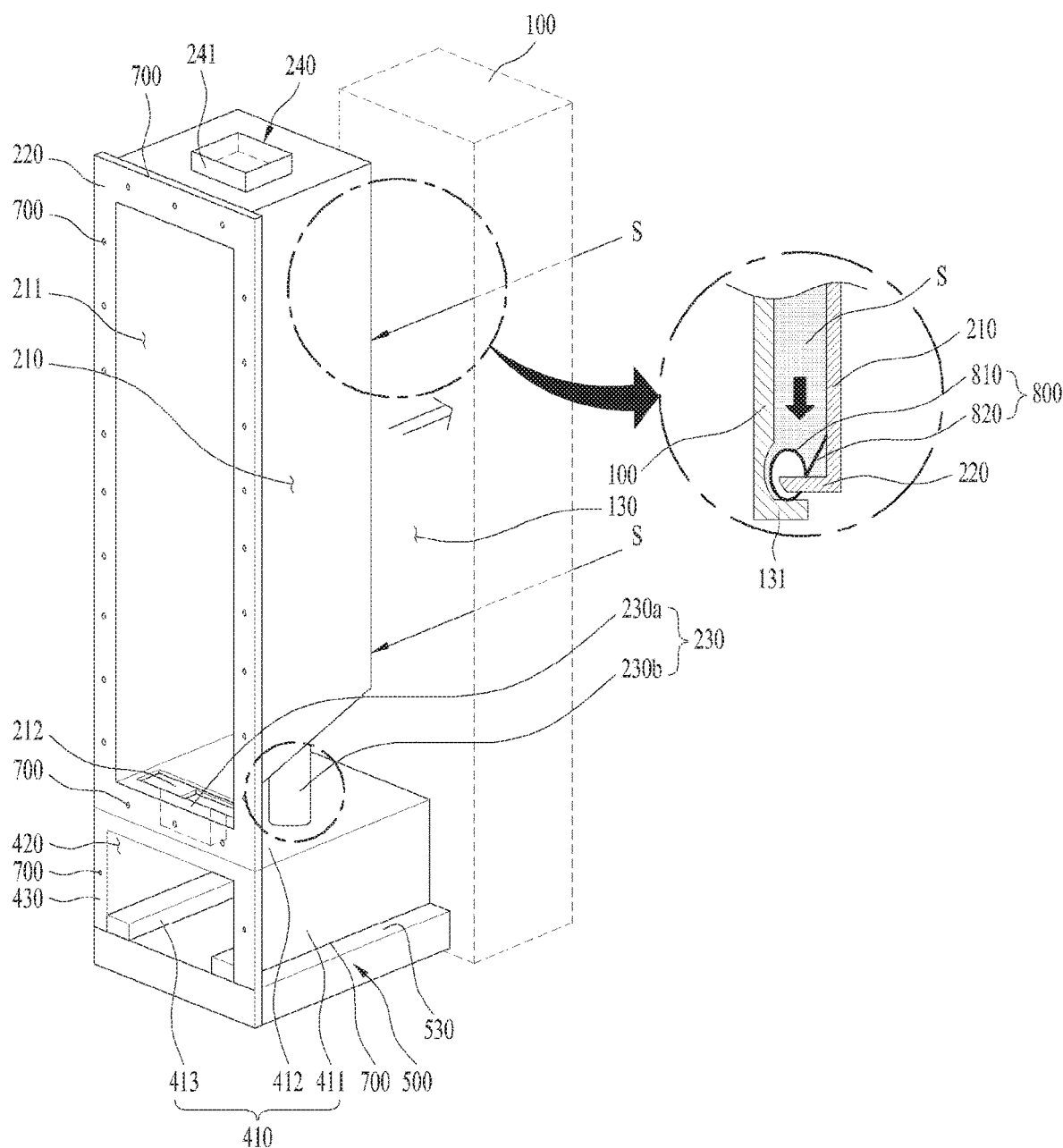
FIG. 14 illustrates a structure that may enhance cohesion between a cabinet and an inner case.

FIG. 14 illustrates an embodiment that a cohesion of the cabinet 100 and the inner case 200 is enhanced.

If the foaming agent S is expanded, the inner case 20 and the shielding rib 220 may be spaced apart from the cabinet 100, whereby the foaming agent S may leak out to the outer circumferential surface of the shielding rib 220.

Therefore, it is required to maintain coupling between the shielding rib 220 and the cabinet 100 in any case.

To this end, the cabinet 100 may further include a coupling rib 131 on the inner circumferential surface to be extended toward or be in contact with the shielding rib 220. The coupling rib 131 may be provided to be extended from the opening 130 to the inside.

The coupling rib 131 may be provided to be in contact with the shielding rib 220 at a certain portion and fixed to the shielding rib 220 if the foaming agent S enters there.

Also, the laundry treating apparatus 10 of the present disclosure may further comprise a coupling unit 800 hung in the coupling rib 131 to accommodate a free end of the shielding rib 220 and coupled with the shielding rib 220.

The coupling unit 800 may include a coupling ring 820 having an insertion surface on one surface, in which the shielding rib 220 may be accommodated, and a pressurizing piece 810 that may pressurize the coupling ring 820.

Therefore, if the coupling unit 800 is seated on the rear surface of the coupling rib 131 and the shielding rib 220 is accommodated in the coupling unit 800 and coupled thereto, the foaming agent S may enter the coupling unit 800 to pressurize the coupling ring 820 and the pressurizing piece 810, thereby rigidly pressurizing the shielding rib 220.

Meanwhile, the cabinet 100 may include a recessed groove on the side to be in contact with an outer circumferential surface of the coupling unit 800.

Therefore, even though the shielding rib 220 and the cabinet 100 are not coupled to each other by a separate coupling member, the shielding rib 220 and the cabinet 100 may be fixedly coupled to each other by the foaming agent S through the coupling piece 800. Even though the foaming agent S is expanded to generate a force for pushing the cabinet 100 to the outside, the shielding rib 220 and the cabinet 100 may be prevented from being spaced apart from each other.

Figure 15:
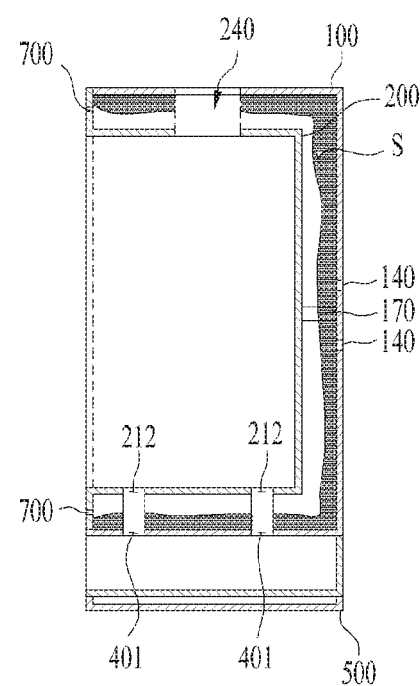
FIG. 15 illustrates a case that a foaming agent is detached from an inner case.

FIG. 15 illustrates a case that the inner case 200 and the foaming agent S may be spaced apart from each other without being adhered to each other.

Even though the foaming agent S is inserted into the inner case, 200, adhesion between the foaming agent S and the inner case 200 may become weak. Therefore, when the foaming agent S is inserted, the foaming agent S may be adhered to the inner case 200 and then spaced apart from the inner case 200 when the foaming agent S is hardened and contracted. Therefore, a hollow hole may be formed between the inner case 200 and the foaming agent S, whereby durability of the inner case 200 may be reduced remarkably. Also, a problem may occur in that heat inside the inner case 200 may be discharged to the space spaced apart from the foaming agent S to reduce heat efficiency.

Figure 16A:
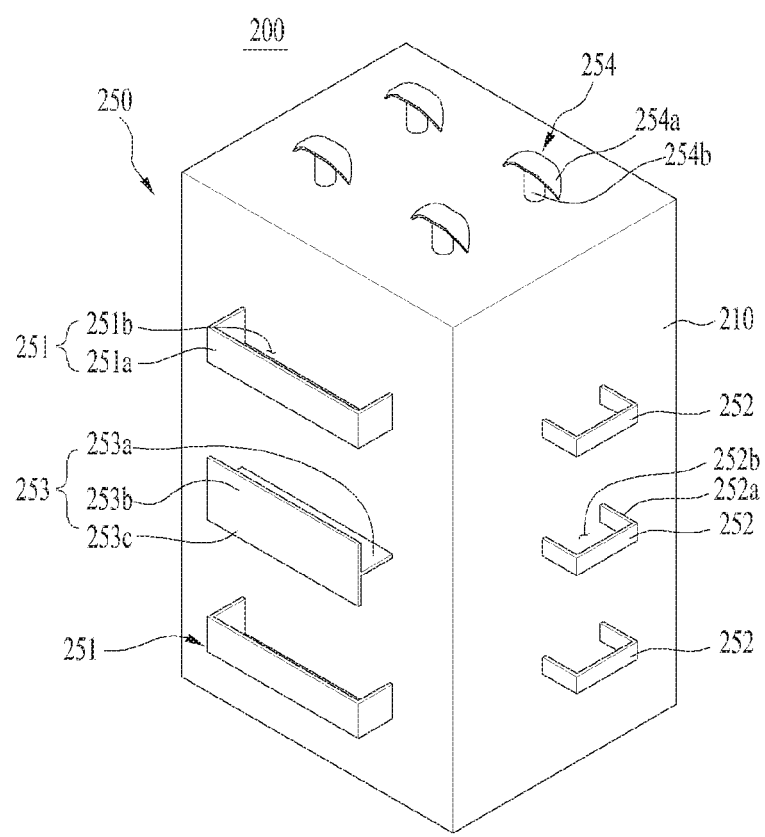
FIGS. 16A and 16B illustrate a grasp portion that may maintain a cohesion between a foaming agent and an inner case.
Figure 16B:
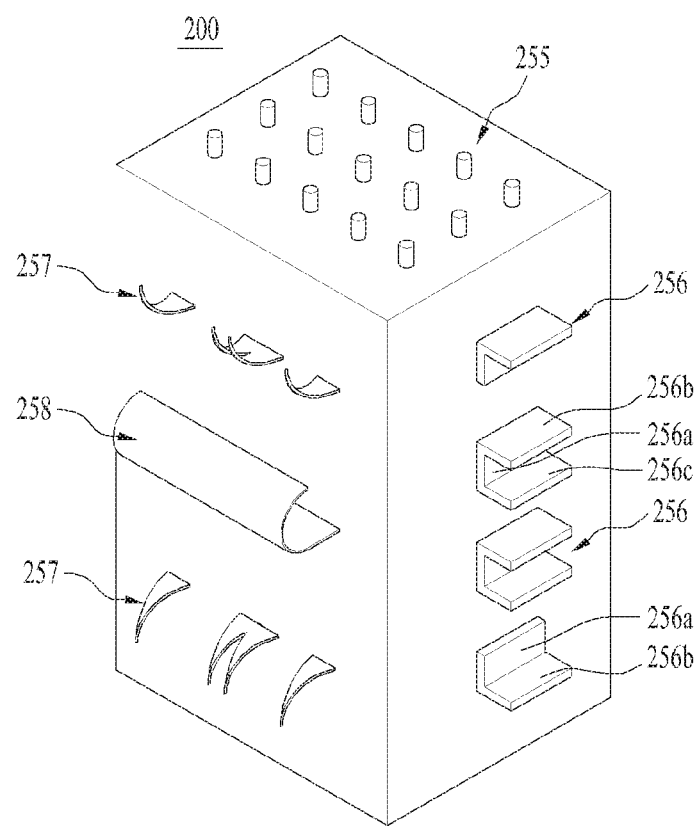

FIGS. 16A and 16B illustrate an embodiment of the present disclosure that may continuously make sure of a cohesion between the inner case 200 and the foaming agent S.

The laundry treating apparatus 10 of the present disclosure may comprise a grasp portion 250 provided to be protruded or recessed from the inner body 210 toward the cabinet and coupled with the foaming agent filled in the space between the cabinet and the inner body 210.

The grasp portion 250 may be provided in a single body with the inner body 210 or may be provided to be coupled with the inner body 210. The grasp portion 250 may include a separate space accommodating the foaming agent S or coupled with the foaming agent S to maintain coupling with the foaming agent S, whereby the foaming agent S and the inner body 210 may be prevented from being detached from each other.

The grasp portion 250 may be made of a material different from that of the inner body 210 and may be made of a material having excellent adhesion with the foaming agent S. Also, even though the grasp portion 250 is made of the same material as that of the inner body 210, its shape may grasp the foaming agent S, thereby maintaining coupling with the foaming agent S.

FIG. 16A illustrates various shapes and structures of the grasp portion 250, and FIG. 16B illustrates another shape and structure of the grasp portion 250.

That is, the grasp portion 250 may be provided in any one of the structures shown in FIGS. 16A and 16B, and one grasp portion 250 or a plurality of grasp portions 250 may be provided.

Referring to FIG. 16A, the grasp portion 250 may include a grasp case 251 protruded from the inner body 210 toward the cabinet to provide a space where the foaming agent S is accommodated.

The grasp case 251 may be provided in the inner body 210 so as not to be in contact with the cabinet 100, thereby not disturbing movement of the foaming agent S.

The grasp case 251 may include a case body 251a coupled to or extended to the inner body 210, having the above space, and a case opening 251b provided on one surface of the case body 251a to allow the foaming agent to enter the above space.

The case body 251a may be provided by shielding the other portions except the case opening 251b.

If the liquid foaming agent S enters the inside of the grasp case 251, the liquid foaming agent may be hardened in a single body with the foaming agent provided outside the grasp case 251.

Therefore, the other surfaces except the grasp opening 251b of the grasp case 251 may be in contact with the foaming agent S and coupled with the foaming agent S, and at the same time may grasp the foaming agent S.

In detail, the grasp opening 251b may be provided in parallel with one surface of the inner body 210. Therefore, since the grasp case 241 is provided to be embedded in the foaming agent S, the foaming agent S cannot be detached from the grasp case 241. As a result, coupling between the foaming agent S and the inner case 200 may be maintained.

Meanwhile, the grasp portion 250 may include a grasp beam 253 protruded from the inner body 210 toward the cabinet 100 and coupled with the foaming agent S.

The grasp beam 253 may include an extension rib 253a protruded from the inner body 210 toward the cabinet, a first grasp rib 253b extended to be inclined from the extension rib 253a, and a second grasp rib 253c provided to be extended from the extension rib 253a in a direction different from the first grasp rib.

The first grasp rib 253b and the second grasp rib 253c may be extended from a free end of the first grasp rib 253b in opposite directions to each other and provided in a shape of T. Also, the first grasp rib 253b and the second grasp rib 253b may be provided to be bent unlike the shown case, and may be extended to be inclined toward the inner body 210.

In other words, the first grasp rib 253b and the second grasp rib 253c may be extended from a free end of the extension rib 253a in parallel with one surface of the inner body 210, may be extended to be far away from the inner body 210, or may be provided to be extended toward the inner body 210.

At this time, the first grasp rib 253b and the second grasp rib 253c are preferably extended toward the inner body 210 to maximize a cohesion between the grasp rib 253 and the foaming agent, and may be provided to form a curve which is upwardly convex.

Meanwhile, the first grasp rib 253b and the second grasp rib 253c may be provided in a plural number to be far away from the free end of the extension rib 253a, and may symmetrically be provided in the extension rib 253a.

In this way, the foaming agent S may be hardened by surrounding the extension rib 253a, the first grasp rib 253b and the second grasp rib 253c. Therefore, the foaming agent S may be prevented from moving in parallel with one surface of the inner body 210 due to the extension rib 253a, and may be prevented from moving to be far away from the inner body 210 due to the first grasp rib 253b and the second grasp rib 253c.

As a result, a cohesion between the inner body 210 and the foaming agent S may be maintained.

The grasp portion 250 may include a grasp ring 252 protruded from the inner body 210 toward the cabinet and coupled to pass through the foaming agent S.

The grasp ring 252 may be provided to allow the foaming agent to pass through there and provided in a shape of a grip.

In detail, the grasp ring 252 may include a ring body 252a provided to be protruded from the inner body 210 in a shape of 'ㄷ' or 'C' and a ring hole 252b provided inside the ring body 252a to allow the foaming agent S to enter there.

In this way, the foaming agent may enter the outside of the grasp ring 252 and then may be hardened in a state that it accommodates the grasp ring 252, and the grasp ring 252 may be provided in a state that it is embedded in the foaming agent S. Therefore, the foaming agent S may maintain the state coupled with the grasp ring 252 to maintain the cohesion with the inner body 210 even though adhesion with the inner body 210 is released.

Since the grasp ring 252 has a small volume, the grasp ring 252 may not disturb movement of the foaming agent S.

Also, the grasp portion 250 may include an anchor 254 provided to be protruded from the inner body 210 toward the cabinet 100. The anchor 254 may include a support 254b and an accommodating portion 254a extended from the above column to two parts.

Also, the support 254b may have an outer circumferential surface provided in a curve to guide the foaming agent S to actively move in contact with the outer circumferential surface. The anchor 254a may be provided to become narrow toward an end, and may be provided to spear the inside of the foaming agent S to fix the foaming agent if the foaming agent S is accommodated therein.

In this way, the foaming agent S and the inner body 210 may be fixed strongly.

The anchor 254 may be provided in a plural number in such a manner that the anchors may be spaced apart from each other along one surface of the inner body 210.

Referring to FIG. 16B, the grasp portion 250 may include a plurality of extension bars 255 provided to be protruded from the inner body 210. The extension bars 255 may be provided in a cylindrical section or an oval section to guide the foaming agent S to easily flow, or may be provided in a polygonal section to improve an adhesion with the foaming agent S if it is accommodated in the foaming agent S.

The extension bars 255 do not have a region for accommodating the foaming agent S but may easily be molded or coupled. If the extension bars 255 are provided in a plural number, a cohesion with the foaming agent S may be ensured.

Meanwhile, the grasp portion 250 may include a grasp vane 257 provided to be curved from the inner body 210 toward the cabinet 100.

The grasp vane 257 may be provided to have one end coupled to the inner body 210 and the other end extended toward the inner body 210 or the space between the cabinet and the inner body.

In this way, if the grasp vane 257 is accommodated in the foaming agent S, the foaming agent S may be in contact with and coupled with the inner body 210 in various angles to improve a cohesion between the foaming agent and the inner body.

The grasp vane 275 may be provided in the inner body 210 in a plural number, and its width may be provided to correspond to or smaller than a width of the inner body 210.

Meanwhile, the grasp portion 250 may include a grasp hook 257 protruded from the inner body 210 and fixed by being accommodated in the foaming agent S.

The grasp hook 257 may be provided to become narrow while being extended from the inner body 210, or may be provided to be inclined at a certain angle or provided to be curved. The grasp hook 257 may be provided in the inner body 210 in a plural number, and may symmetrically be provided based on the injection holes 140.

Also, the grasp hook 257 may be extended to be protruded from the inner body 210 to both parts or more.

In this way, the grasp hook 257 may not disturb movement of the foaming agent S, and may fix the foaming agent by spearing the foaming agent S if it is accommodated in the foaming agent S, whereby the foaming agent S may be prevented from being detached from the inner body 210.

Figure 17:
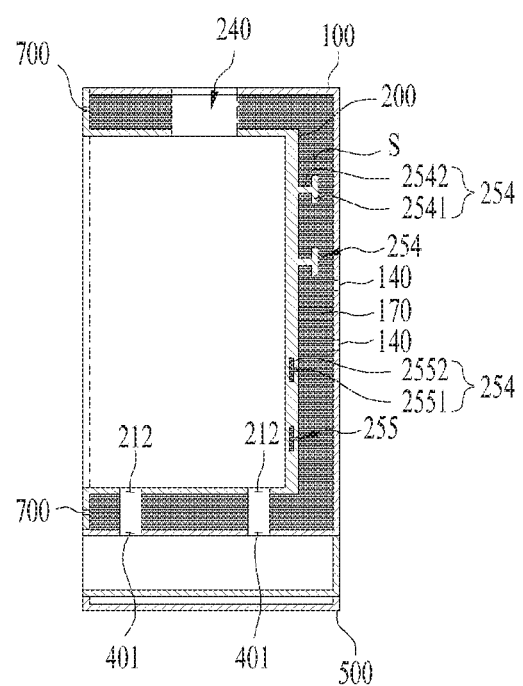
FIG. 17 illustrates another embodiment of a grasp portion that may maintain a cohesion between a foaming agent and an inner case.

FIG. 17 illustrates another embodiment of the grasp portion.

The grasp portion 250 may include a grasp protrusion 254 provided to be protruded on one surface of the inner case 200 and accommodated in the foaming agent.

The grasp protrusion 254 may include an extension column 2542 protruded from one surface of the inner body 210, and a head 2541 provided at a free end of the extension column 2542 and provided to be greater than a diameter of the extension column.

The grasp protrusion 254 may not disturb movement of the foaming agent S because volumes of the extension column 2542 and the head 2541 are not great.

Also, the head 2541 may easily be in contact with and accommodated in the foaming agent S, whereby the foaming agent S may be prevented from being detached from the head 2541 in parallel with the inner body 210 and to be away from the inner body 210.

The grasp protrusion 254 may be provided on the side or the rear surface of the inner body 210 to be spaced apart from another grasp protrusion in a plural number, may be provided to be coupled with the inner body 210, or may be provided to be molded in a single body with the inner body 210.

Meanwhile, the grasp portion 250 may include a grasp hole 255 recessed from the inner body 210 and fixed by inflow of the foaming agent.

The grasp hole 255 may include an inflow hole 2551 recessed in the inner body 210 and an accommodating groove 2552 provided to be greater than a diameter of the inflow hole at an end of the inflow hole 2551 to provide a space where the foaming agent enters.

In this way, if the foaming agent enters the inside of the cabinet 100, the liquid foaming agent may be permeated into the inflow hole 2551 and may fill the accommodating groove 2552.

As a result, since the foaming agent S is partially accommodated in the inner body 210 and coupled with the inner body 210, the foaming agent S may be prevented from being detached from the inner body 210.

The grasp hole 255 may be provided on the side or the rear surface of the inner body 210 to be spaced apart from another grasp hole in a plural number, and a bent hole (not shown) may additionally be provided at an end of the accommodating groove 2552 toward the surface of the inner body 210 to allow the foaming agent S to easily enter there.

In this way, the inner case 200 of the present disclosure may maintain a cohesion with the foaming agent S even though the inner case is made of a material that does not make sure of adhesion with the foaming agent S.

Figure 18:
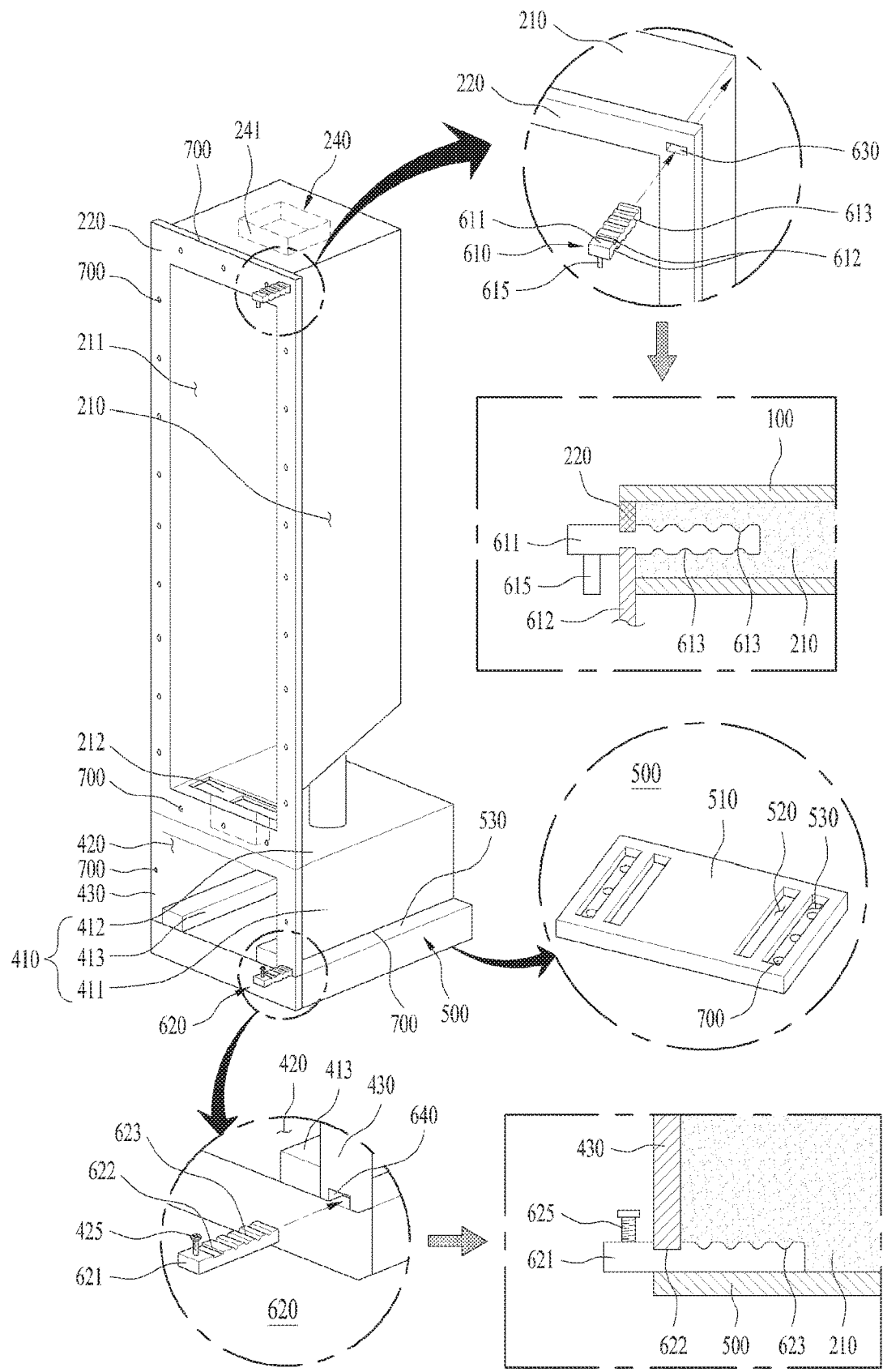
FIG. 18 illustrates a structure that a hinge unit and a base are simultaneously coupled by a foaming agent.

FIG. 18 illustrates a structure that a hinge unit 600 and a base 500 of the laundry treating apparatus 10 of the present disclosure are fixed to the cabinet 100 simultaneously with the inner case 200 and the hot-air supply unit 400 by the foaming agent S.

Meanwhile, the laundry treating apparatus 10 of the present disclosure comprises a hinge unit 600 provided to couple the door 180 for opening or closing the opening with the cabinet. At this time, if the hinge unit 600 is coupled to the cabinet 100, etc. after the foaming process is completed, there is inconvenience in that additional assembly process occurs.

Moreover, if the hinge unit 600 is coupled to the cabinet 100, the inner case 200, etc. through a bolt or a coupling member, a crack may occur in the foaming agent S provided inside the cabinet 100.

Also, if the base 500 is separately assembled after the inner case 200 and the hot-air supply unit 400 are fixed to the cabinet 100, additional assembly process occurs.

Moreover, if the base 500 is coupled with the hot-air supply unit 400 or the hot-air supply unit 400 or the lower portion of the cabinet 100 by a coupling member such as a bolt, a crack may occur in the foaming agent S provided inside the cabinet 100 accommodated therein.

Therefore, the hinge unit 600 and the base 400 may preferably be coupled with or fixed to each other by the foaming agent S to simplify the assembly process, improve productivity and ensure durability of the foaming agent S.

The laundry treating apparatus 10 of the present disclosure may further include a hinge unit 600 rotatably coupling the door 180 to the cabinet 100. At this time, one or more of the hinge unit 600 and the base 500 may be provided to be fixed to the cabinet 100 together with the inner case 200 and the hot-air supply unit 400 when the inner case 200 and the hot-air supply unit 400 are fixed by the foaming agent S.

In this way, the process of separately assembling and coupling the hinge unit 600 with the base 500 may be omitted, and the coupling member such as a bolt may be inserted to the foaming agent S.

The base 500 may include a base body 510 provided at the lower portion of the hot-supply unit 400 to form the bottom surface of the cabinet 100. The base body 510 may be provided in a shape of a plate and made of an elastic material or made of a resin or metal material.

The base body 510 may be provided with a body coupling unit 520 where the hot-air supply unit 400 is seated. The body coupling unit 520 is a region where the lower surface of the accommodating body 410 is seated, and may be provided to be in surface contact with the accommodating body 410. The base body may be provided as a groove into which the lower surface of the accommodating body 410 is fully inserted and fixed. In this way, the base 500 and the hot-air supply unit 400 may stably be coupled with each other.

Meanwhile, the base body 510 may include a leakage prevention unit 530 further extended from the body coupling unit 520 to the side of the cabinet 100. That is, the leakage prevention unit 530 may be a portion further extended from the region where the accommodating body 410 of the base body 510 is seated, to the side.

The leakage prevention unit 530 may be provided such that the foaming agent S may be seated thereon and coupled thereto, whereby the foaming agent S may be prevented from leaking to the outside of the cabinet 100. Moreover, the leakage prevention unit 530 may further include a foaming agent accommodating groove 531 into which the foaming agent S is inserted to be accommodated therein, to enhance a cohesion with the foaming agent S.

A plurality of bent holes 700 may be provided to guide the foaming agent S to enter the foaming agent accommodating groove 531 and guide the foaming agent to be accommodated in the foaming agent accommodating groove 531.

In this way, the foaming agent S may enter the injection holes 140 and then reach the outside of the accommodating body 410 and the base 500 at the same time. Afterwards, the foaming agent S may further flow from the outside of the accommodating body 410 and may be filled to reach the leakage prevention unit 530. As a result, the hot-supply unit 400 and the base 500 may simultaneously be coupled to the cabinet by the foaming agent, and the assembly process using a separate bolt may be omitted.

Meanwhile, the hinge unit 600 may include an upper hinge 610 coupled to the upper region of the cabinet to allow the door to be rotatably coupled thereto. The upper hinge 610 may be coupled to the inner case 200, or may directly be coupled to the cabinet 100.

However, the upper hinge 610 may be coupled by being inserted between the inner case 200 and the cabinet 100 to enhance a cohesion.

The upper hinge 610 may be inserted into a space between the inner case 200 and the cabinet to pass through the space, and then may be fixed by the foaming agent S.

In detail, the shielding rib 220 may include an upper through hole 630 at an upper portion, wherein the upper hinge 610 may be inserted into the upper through hole 630 by passing through the upper through hole 630. In this way, the upper hinge 610 may be inserted into the upper through hole 630 before the foaming agent S is in contact with the shielding rib 220, whereby its position may be fixed.

The upper hinge 610 may include an upper body 611 inserted into the upper through hole 630 and an upper hinge shaft 615 extended to a lower portion of the upper body and provided to allow the door to be rotatably coupled therewith. In this way, if the upper body 611 is inserted into the upper through hole 630, the foaming agent S may also fix the upper body 611 when fixing the inner case 200. That is, the upper body 611 may be coupled with the foaming agent S by being fully accommodated in the foaming agent S.

Also, the upper body 611 may further include an upper recessed groove 612 accommodating the shielding rib 220 to seat the shielding rib 220 thereon, whereby its position may not be varied when the foaming agent S is expanded. The upper recessed groove 612 may be provided with a width corresponding to a thickness of the shielding rib 220 to partially accommodate the shielding rib 220 therein.

Also, the upper body 611 may further include a first coupling guide surface 613 having a concave and convex shape on an outer surface to more enhance a cohesion with the foaming agent S, thereby improving a frictional force.

The coupling guide surface 613 may be provided in the same shape as that of the upper recessed groove 612, or may be provided with a width different from that of the upper recessed groove 612. The coupling guide surface 613 may improve a contact area with the foaming agent S, and may improve a cohesion of the upper hinge 610 fixed to the foaming agent S by partially accommodating the foaming agent S.

Meanwhile, the laundry treating apparatus 10 of the present disclosure may include a lower hinge 620 coupled to the front of the hot-air supply unit 400 to allow the door 10 to be rotatably coupled thereto, wherein the lower hinge 620 may be provided to be coupled between the hot-air supply unit 400 and the cabinet 100.

In detail, the lower hinge 620 may be provided to be inserted between the hot-air supply unit 400 and the cabinet 100 and fixed to the foaming agent S.

The hot-air supply unit 400 may include a lower through hole 640 at the lower portion of the prevention rib 430 to allow the lower hinge 620 to be inserted thereinto.

The lower through hole 640 may be provided to be connected with a upper surface of the base body 510. In this way, if the lower hinge 620 is inserted into the lower through hole 640, its lower surface may be seated on the base body 610 and supported.

The lower hinge 620 may include a lower body 621 inserted into the lower through hole 640 and a lower hinge shaft 625 extended to an upper portion of the lower body 621 to allow the door to be rotatably coupled thereto.

Meanwhile, the lower body 621 may further include a lower recessed groove 622 accommodating the prevention rib 430 to seat the prevention rib 430 thereon, whereby its position may not be varied when the foaming agent S is expanded. The lower recessed groove 622 may be provided with a width corresponding to a thickness of the prevention rib 430 to partially accommodate the prevention rib 430 therein.

Also, the lower body 621 may further include a second coupling guide surface 623 having a concave and convex shape on an outer surface to more enhance a cohesion with the foaming agent S, thereby improving a frictional force. The second coupling guide surface 623 may be provided in the same shape as that of the lower recessed groove 622, or may be provided in a shape different from that of the lower recessed groove 622.

In this way, if the lower hinge 620 is inserted into the lower through hole 640, the lower hinge 620 may be fixed together with the accommodating body 410 and the base 500 when the foaming agent S fixes the accommodating body 410 and the base 500. That is, the lower hinge 620 may be fixed in such a manner that the lower body 621 is accommodated in the foaming agent S.

In this way, the hinge unit 600 and the base 500 may be fixed by the foaming agent S, and a separate assembly process may be omitted.

Figure 19:
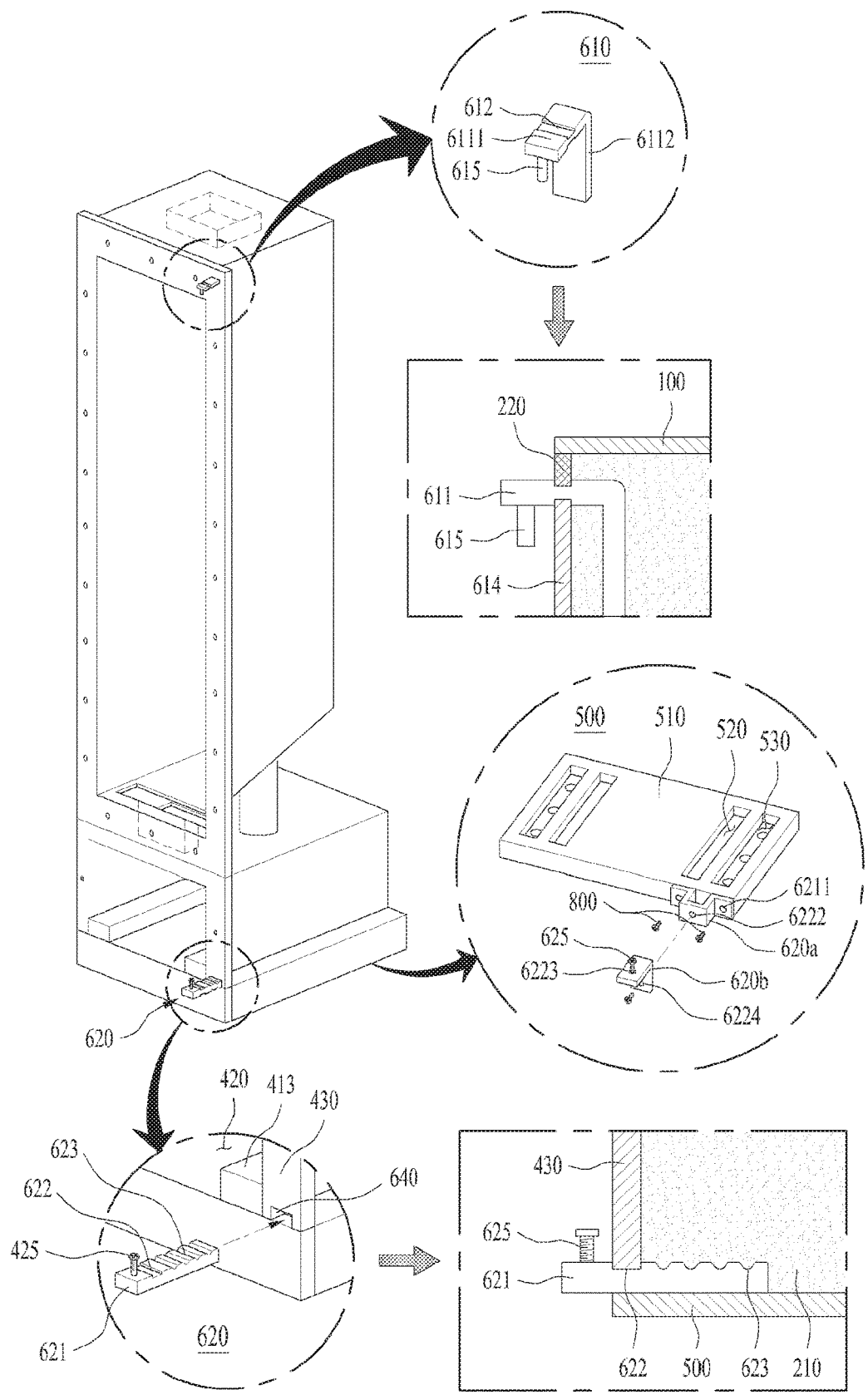
FIG. 19 illustrates another structure that a hinge unit and a base are simultaneously coupled by a foaming agent.

FIG. 19 illustrates another embodiment of the laundry treating apparatus 10 of the present disclosure.

The upper body 611 of the upper hinge 610 may include a second body 6112 inserted into the upper through hole 630 to contact the shielding rib 220, and a first body 6111 bent from the second body to provide the upper hinge shaft 625 at a lower portion.

The first body 6111 and the second body 6112 may be provided to be bent at 90°. In this way, when the second body 6112 is tightly adhered to the shielding rib 220 and coupled with the foaming agent S, the second body 6112 may be tightly adhered to the shielding rib 220, whereby a cohesion of the upper hinge 610 may be improved.

Also, the portion where the first body 6111 and the second body 6112 are bent may be provided to be curved such that the upper body 611 may easily be inserted and rotated.

Meanwhile, the lower hinge 620 may be provided to be separately coupled to the base body 500.

That is, the lower hinge 620 may include a first lower body 620a coupled to the base body, and a second lower body 620b coupled to the first lower body 620a and provided with the lower hinge shaft 625.

The first lower body 620a may include a coupling zone 6211 coupled to the base body, and an accommodating coupling unit 6222 extended from the coupling zone 6211 to the front to form a space into which the second lower body 620b is inserted.

The coupling zone 6211 and the accommodating coupling unit 6222 may be provided in a shape of '⊏' or 'C'.

Meanwhile, the second lower body 620b may include an insertion coupling unit 6224 coupled by being inserted into the accommodating coupling unit 6222, and a shaft extension unit 6223 extended to the insertion coupling unit 6224 by being bent and provided with the lower hinge shaft 625.

The shaft extension unit 6223 and the insertion coupling unit 6224 may be provided to be bent at 90°.

The lower hinge 620 may be coupled to a separate coupling member 800 and provided to stably support load of the door 180.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A laundry treating apparatus comprising:
a cabinet having an opening in a front direction;
a door rotatably provided in front of the opening to open or close the opening;
an inner case provided in the cabinet to form an accommodation space in which laundry is accommodated; and
a hot-air supply unit provided at a lower portion of the inner case, the hot-air supply unit including an accommodating body to form a space separated from the accommodation space and a heat pump accommodated in the space, the heat pump supplying at least one of hot air and moisture to the accommodation space; and
a communication duct configured to communicate the space formed by the accommodating body with the accommodation space,
wherein a foaming agent is filled in an outside of the inner case, outside of the accommodating body, outside of the communication duct and inside of the cabinet, and
wherein the foaming agent adheres the inner case, the accommodating body and the cabinet.

2. The laundry treating apparatus of claim 1, wherein the foaming agent maintains strength and shape when the foaming agent is hardened.

3. The laundry treating apparatus of claim 2, wherein the cabinet includes:
injection holes into which the foaming agent is injected; and
a plurality of bent holes discharging the air between the cabinet and the inner case and the air between the inner case and the hot-air supply unit.

4. The laundry treating apparatus of claim 2, further comprising a hollow portion provided between an upper surface of the cabinet and an upper surface of the inner case as an empty space where the foaming agent does not enter.

5. The laundry treating apparatus of claim 4, further comprising a hanging unit coupled to the upper surface of the inner case to hang or excite the laundry, wherein the hanging unit is provided to be arranged inside the hollow portion.

6. The laundry treating apparatus of claim 1, further comprising a grasp portion provided to be protruded or recessed from the inner case toward the cabinet and coupled with the foaming agent provided between the cabinet and the inner case.

7. The laundry treating apparatus of claim 6, wherein the grasp portion includes:
a grasp case protruded from the inner case toward the cabinet, the grasp case accommodating the foaming agent; and
a grasp opening provided on one surface of the grasp case to allow the foaming agent to enter the grasp case.

8. The laundry treating apparatus of claim 6, wherein the grasp portion includes a grasp beam protruded from the inner case toward the cabinet and coupled with the foaming agent.

9. The laundry treating apparatus of claim 6, wherein the grasp portion includes a grasp ring protruded from the inner case toward the cabinet and coupled with the foaming agent by allowing the foaming agent to pass through there.

10. The laundry treating apparatus of claim 6, wherein the grasp portion includes a grasp protrusion protruded to one surface of the inner case and accommodated in the foaming agent.

11. The laundry treating apparatus of claim 1, further comprising:
a hinge unit rotatably coupling the door to the cabinet; and
a base provided at a lower portion of the hot-air supply unit to support the inner case and the hot-air supply unit,
wherein at least any one of the hinge unit and the base is fixed to the cabinet together with the inner case and the hot-air supply unit when the inner case and the hot-air supply unit are fixed by the foaming agent.

12. The laundry treating apparatus of claim 11, wherein the base includes:
a base body provided at a lower portion of the hot-air supply unit to form a bottom surface of the cabinet;
a body coupling unit provided in the base body to allow the hot-air supply unit to be seated thereon; and
a leakage prevention unit extended from the body coupling unit to both sides of the cabinet to prevent the foaming agent from leaking out, and
wherein the foaming agent simultaneously fixes the hot-air supply unit and the leakage prevention unit when it is injected into the cabinet.

13. The laundry treating apparatus of claim 12, wherein the hinge unit includes a lower hinge coupled to the base body to allow the door to be rotatably coupled thereto.

14. The laundry treating apparatus of claim 13, wherein the lower hinge includes:
a lower body coupled to the base body;
a hinge body coupled to the lower body to allow the door to be rotatably coupled thereto; and
a lower hinge shaft extended from the hinge body to an upper portion to form a rotary shaft of the door.

15. The laundry treating apparatus of claim 14, wherein the hinge unit includes an upper hinge provided to allow the door to be rotatably coupled thereto, and the upper hinge is inserted between the inner case and the cabinet and is fixed by the foaming agent.

16. The laundry treating apparatus of claim 1, wherein the communication duct is located between the inner case and the accommodating body.

17. The laundry treating apparatus of claim 16, wherein the communication duct is connected to the inner case and the accommodating body before injecting the foaming agent into a foaming space of the cabinet.

18. The laundry treating apparatus of claim 16, further comprising:
a communication hole located at a lower surface of the inner case; and
a communication inlet located at a top surface of the accommodating body, wherein the communication duct connects the communication hole and the communication inlet.

19. The laundry treating apparatus of claim 16, wherein the communication duct includes a first communication duct and a second communication duct arranged along a front-rear direction of the cabinet.

20. The laundry treating apparatus of claim 1, further comprising:
a hollow portion located between a top side of the cabinet and a top side of the inner case for defining an empty space and preventing leakage of the foaming agent into the hollow portion;
a hanger bar located in an upper portion inside the accommodating space, and configured to receive the laundry thereon; and
an excitation unit located in the hollow portion for vibrating the hanger bar.

* * * * *